United States Patent
Phelan et al.

(10) Patent No.: US 7,621,078 B2
(45) Date of Patent: Nov. 24, 2009

(54) TELESCOPING MAST HAVING VARIABLE HEIGHT LOCKING AND A CHAIN ERECTION MECHANISM WITH A CABLE MANAGEMENT SYSTEM

(75) Inventors: Michael Phelan, Florissant, MO (US); Michael Miller, Richmond Heights, MO (US); Tom Ellington, Alton, IL (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 29 days.

(21) Appl. No.: 11/336,265

(22) Filed: Jan. 20, 2006

(65) Prior Publication Data

US 2006/0219144 A1 Oct. 5, 2006

Related U.S. Application Data

(60) Provisional application No. 60/645,291, filed on Jan. 20, 2005, provisional application No. 60/712,242, filed on Aug. 29, 2005.

(51) Int. Cl.
*E04H 12/34* (2006.01)
*E04H 12/18* (2006.01)

(52) U.S. Cl. ............................. 52/121; 52/118; 52/632; 254/DIG. 6; 474/225

(58) Field of Classification Search .................. 52/114, 52/118, 123.1, 632, 844, 121, 111, 116, 117; 254/DIG. 6, 95; 212/295; 474/206, 219, 474/220, 222, 224, 225
See application file for complete search history.

(56) References Cited

U.S. PATENT DOCUMENTS

| | | | | | |
|---|---|---|---|---|---|
| 486,389 | A | * | 11/1892 | Wright | 254/95 |
| 1,834,900 | A | * | 12/1931 | Holmfs | 187/213 |
| 2,324,614 | A | * | 7/1943 | Dalton | 116/28 R |
| 2,375,461 | A | * | 5/1945 | Bender | 52/108 |
| 2,375,462 | A | * | 5/1945 | Bender | 52/108 |
| 2,437,510 | A | * | 3/1948 | Ditty | 403/105 |
| 2,554,300 | A | * | 5/1951 | Hayakawa | 52/108 |
| 2,574,657 | A | * | 11/1951 | Pierce | 254/1 |
| 2,643,745 | A | * | 6/1953 | Olszewski | 52/108 |
| 2,661,082 | A | * | 12/1953 | Ziegler | 52/108 |
| 3,012,635 | A | * | 12/1961 | Blain | 187/250 |
| 3,082,893 | A | * | 3/1963 | Hollings et al. | 414/626 |
| 3,645,146 | A | * | 2/1972 | Nagin | 74/89.21 |
| 3,805,462 | A | * | 4/1974 | Caperton | 52/108 |
| 3,963,037 | A | * | 6/1976 | Clark | 135/65 |
| 4,325,206 | A | * | 4/1982 | Caperton | 52/108 |
| 4,651,480 | A | * | 3/1987 | Kramer | 52/108 |
| 5,056,278 | A | * | 10/1991 | Atsukawa | 52/108 |
| 5,102,375 | A | * | 4/1992 | Featherstone | 474/155 |
| 5,139,464 | A | * | 8/1992 | Lehnert | 474/155 |
| 5,168,679 | A | | 12/1992 | Featherstone | |
| 5,347,770 | A | * | 9/1994 | McDonnell et al. | 52/108 |
| 5,355,643 | A | * | 10/1994 | Bringolf | 52/108 |

(Continued)

*Primary Examiner*—Robert J Canfield
*Assistant Examiner*—Brent W Herring
(74) *Attorney, Agent, or Firm*—Sonnenschein Nath & Rosenthal LLP

(57) ABSTRACT

A telescoping mast for supporting and raising a load may be telescopically extended by a zipper-action chain extension system further comprising a system for the management of one or more cables, such as power or communication cables traversing the length of the mast, and is capable of being locked into a rigid formation along a range of telescopic lengths.

9 Claims, 17 Drawing Sheets

U.S. PATENT DOCUMENTS

| | | | |
|---|---|---|---|
| 5,540,021 A * | 7/1996 | Daneshvar | 52/263 |
| 5,803,418 A * | 9/1998 | Bringolf et al. | 248/158 |
| 6,224,037 B1 * | 5/2001 | Novick | 254/95 |
| 6,419,603 B1 * | 7/2002 | Grasl | 474/202 |
| 6,494,005 B2 * | 12/2002 | Zimmerman | 52/296 |
| 6,530,177 B1 * | 3/2003 | Sørensen | 49/325 |
| 7,237,654 B2 * | 7/2007 | Sakura et al. | 187/270 |
| 7,270,619 B2 * | 9/2007 | Bourc'His | 474/202 |

* cited by examiner

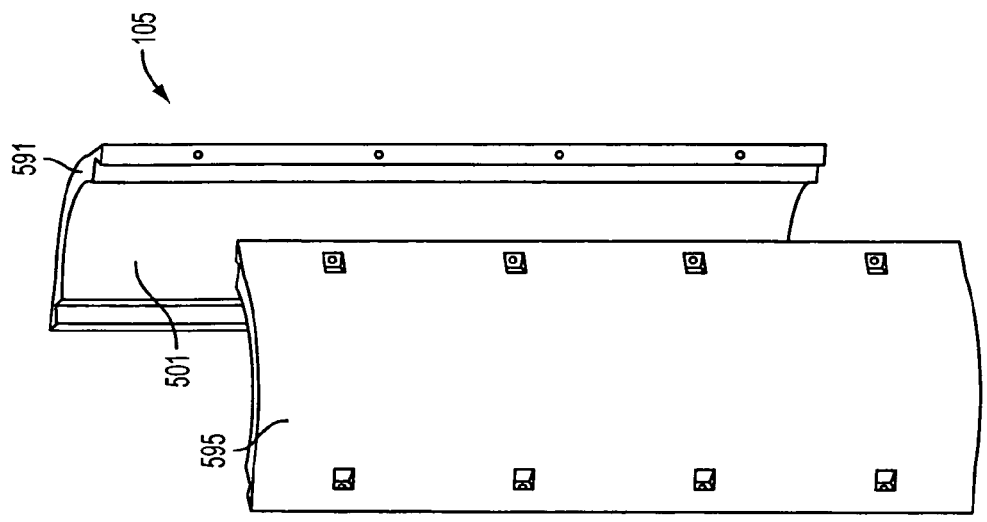
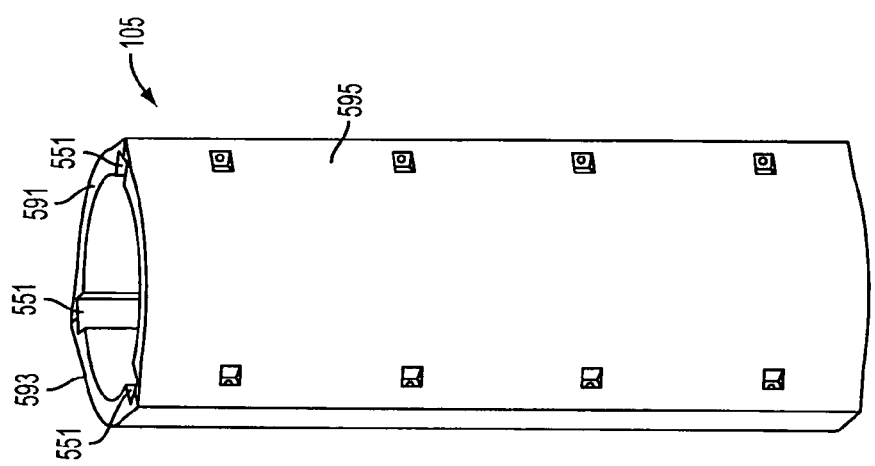

TELESCOPING MAST HAVING VARIABLE HEIGHT LOCKING AND A CHAIN ERECTION MECHANISM WITH A CABLE MANAGEMENT SYSTEM

CROSS REFERENCE TO RELATED APPLICATIONS

This application claims the benefit of U.S. Provisional Application No. 60/645,291, filed Jan. 20, 2005, and U.S. Provisional Application No. 60/712,242, filed Aug. 29, 2005.

BACKGROUND OF THE INVENTION

1. Field of the Invention

An embodiment of the invention generally provides a telescoping mast for supporting and raising a load. More particularly, an embodiment provides a telescoping mast, which is capable of being locked into a generally rigid formation along a range of telescopic lengths, and which is telescopically extended by a zipper-action chain extension system further comprising a system for the management of one or more cables.

2. Description of Related Art

Collapsible masts are well known in the art, and generally provide the ability to raise and lower a load mounted thereon from some minimum height, when the mast is in a collapsed configuration, to a desired elevation, but not higher than the maximum extension height of the mast. While it should be obvious to one of ordinary skill in the art that such a mast can be used to extend horizontally, or in other directions with respect to the ground, telescoping masts will generally be discussed herein as extending vertically, i.e., raising (upward) and lowering (downward) with respect to the ground.

In the collapsed, fully lowered configuration, the mast occupies significantly less space than when extended. The lowered position generally also provides a lower center of gravity for the load. Thus, in the collapsed position there is generally a reduced lever force exerted by the load through the mast against the base of the mast as compared to the forces exerted by the load when in the extended position. On a vehicle-mounted mast, the load will generally experience forces that tend to rotate it and the top of the mast relative to the base thereof, due for instance to an uneven or non-level route of travel. Therefore, for a vehicle-mounted mast, the reduced lever force achieved in the collapsed position can be highly beneficial during transport.

In the raised position, the mast may elevate the load above nearby objects that would otherwise interfere with operation of instruments that comprise the load, such as by interrupting a necessary line-of-sight between the instruments and a more distant location. For instance, it is common for trucks used by mass media production companies (e.g., news trucks) to utilize a telescoping mast to raise broadcast antennas. Military forces also make use of masts mounted on vehicles, for instance, to provide for artillery observing. Forward observer vehicles will often include an array of targeting instrumentation on a mast, which can be raised to allow the instruments to "see" over concealing terrain such as a berm or brush. The mast, therefore, can be utilized as an aid to provide for more accurate observing and targeting, while still allowing the observers in the vehicles to be more protected from enemy sight.

One type of collapsible mast which is useful in this situation is a telescoping mast wherein the mast comprises a series of interlinked sequentially nesting segments, each one generally having a smaller circumference and cross-sectional area than the prior segment in the sequence. When collapsed, the telescoping mast will have the various mast segments arranged one inside the other in a nested arrangement. Therefore, in the collapsed position, the external shape and size of the mast may only be as large as its largest segment.

This telescoping mast is extended by moving the segments out from inside each other, which when fully extended produces a tapered, hollow pole. Generally, the smaller internal mast sections will extend to a higher elevation to keep the center of gravity of the mast lower, but that is by no means necessary. For ease of discussion, telescoping masts herein will be assumed to extend with the smaller internal segments being extended upward from within the larger segments. One of ordinary skill in the art would understand how to utilize the devices discussed herein on masts that extend in an alternate manner.

Once a telescoping mast is extended, the segments must be held in their relative extended positions to support the raised load which is at the top of the mast. In a basic design, the mast is extended by a drive device, such as a motor, which can then hold the segments in place in an extended position by utilizing a lock on the motor that prohibits collapse of the drive mechanism, or similarly by maintaining motor braking to continuously support the mast in the extended position.

Such systems utilizing only the drive mechanism to maintain the mast at an extended position generally do not produce as stable a mast as one in which the segments are securely connected together when extended. Securely connecting segments are often called "locking" a mast. Such connection may be achieved through at least a couple of methods. In one, each of the mast segments is tapered slightly with the wider and narrower ends arranged at the same relative ends of each mast segment. As the inner segments extend relative to the outer segments, the wider end of the smaller segment is moved toward the narrower end of the larger segment. These two segments are sized and shaped so that the smaller segment's wide end is slightly wider than the larger segment's narrow end. In this arrangement, the ends of adjacent segments will contact and be forced into a frictionally tight fit. This frictional fit provides for rigidity between the two segments by effectively forming the segments into a single interconnected structure. The problem with this design is discovered upon collapsing the mast. The stronger the connection between the segments when extended, the more force required to separate the segments to collapse the mast. Further, as pieces become worn, the frictional connection strength will be decreased and the mast becomes less rigid. For these reasons, this design is rarely used on large commercial masts.

In an alternate design, the segments have straight, non-tapered sides, and include a locking mechanism. These segments have a locking actuator fixed in position at both an upper position and a lower position, which positions generally closely correlate with the top and bottom of a segment. In this alternate design, a pair of locking rings circumscribes each segment (except the most outer one). Each ring freely floats between two segments, until it becomes compressed between the actuators of adjacent segments as those segments are extended relative to one another. At a certain extension, the actuators begin to force the two rings against the surfaces of the adjacent segments causing the segments to frictionally engage each other via the rings. This system is generally easier to disengage than the frictional fit of tapered segments.

Both the methods discussed above are efficient for providing a relatively rigid resultant mast, but both are limited by requiring the resultant mast to have a fixed extension at which the locking mechanism is engaged. This means that the mast generally has only two stable positions, a lowered position where it is fully collapsed, and a raised position where it is fully extended and the locks are engaged. As discussed above, while the lift drive could stop the extension at any intermediate point, such an intermediate position is not as stable as either of the fully extended and locked or the fully collapsed positions. It has generally not been possible to lock the mast at an intermediate height, since the prior art shows the locking actuators in fixed positions on the various segments.

An additional problem encountered with prior art collapsible masts is that cables, such as power and communication cables, that are routed generally from the base of the mast up to the load at the elevated end of the mast are a challenge to manage, and may require complex apparatuses to ensure that the cables are not entangled in the mast components or other nearby equipment, particularly during collapse of the mast. Without such a complex cable management apparatus, a user has been left to bear the risk of entanglement.

SUMMARY OF THE INVENTION

An embodiment of the invention is a mast erection system comprising at least two chain assemblies, the chain assemblies able to cooperatively interact to form a generally rigid column having an internal, generally columnar space, the space able to house a cable assembly. In an embodiment, such flexible chain assemblies comprise links connected by plates; wherein a first chain assembly comprises plates having a first face from which protrudes a pedestal topped by a button; wherein a second chain assembly comprises plates having a notch therein at the circumference thereof; and wherein when the first and second chain assemblies are brought into alignment to form the generally rigid column, the pedestal is positioned in the notch so that the plate of the second chain assembly is generally constrained between the face and the button from motion in the general direction of protrusion of the pedestal. In an alternate embodiment, such flexible chain assemblies comprise links connected by plates; wherein the plates comprise primary and secondary plates in generally parallel orientation and spaced apart so as to form a channel therebetween; and wherein when the chain assemblies are aligned to form the column, a primary or secondary plate of a first chain assembly is positioned into the channel between plates of a second chain assembly.

An embodiment of the invention is a mast erection system comprising at least two chain assemblies, the chain assemblies able to cooperatively interact to form a generally rigid column; a cable assembly connected to at least one of the chain assemblies; and a mechanism for moving portions of the chain assemblies into cooperative alignment. In an embodiment such a mast erection system further comprises a drive means to operate the mechanism for moving portions of the chain assemblies. In an alternate embodiment such a mast erection system further comprises an attachment means for connecting the cable assembly to the chain assembly. In an embodiment, such an attachment means is a plurality of hooks. In an alternate embodiment, such a mast erection system further comprises a generally rigid column comprised of the chain assemblies; wherein at least a portion of the cable assembly traverses a portion of the length of the generally rigid column, the portion of the cable assembly being positioned in a space generally between the chain assemblies. In an embodiment, the portion of the cable assembly is enclosed within the column.

An embodiment of the invention is a telescoping locking mast assembly comprising a mast comprising at least two nested mast segments capable of telescopic extension to a locked position, and a mast erection system capable of extending the mast into the locked position, the mast erection system comprising at least two chain assemblies, which are able to cooperatively interact to form a generally rigid column; a cable assembly connected to at least one of the chain assemblies; and a mechanism for moving portions of the chain assemblies into cooperative alignment.

A telescoping locking mast comprising at least two adjacent nested mast segments comprising an inner segment and an outer segment, the adjacent nested mast segments being capable of telescopic extension relative to one another; a first locking element; and a first actuator; wherein each of the first locking element and the first actuator are located between the adjacent nested mast segments, and are capable of variable positioning relative to at least one of the mast segments; and wherein the mast segments can be locked in a variety of positions of extension by the interaction of the two adjacent nested mast segments through the first locking element when the first locking element is engaged by the first actuator. In an embodiment the first locking element is a locking ring that generally circumscribes the inner mast element; and wherein the engagement of the first actuator with the locking ring tends to alter the radius of the locking ring.

In an alternate embodiment such a telescoping locking mast further comprises a second locking element and a second actuator, each of which are located between the adjacent nested mast segments, and are capable of variable positioning relative to at least one of the mast segments. In an embodiment of such a telescoping locking mast the mast segments can be locked at a variety of positions of extension by the interaction of the two adjacent nested mast segments through the first locking element when the first locking element is engaged by the first actuator, through the second locking element when the second locking element is engaged by the second actuator, or through both of the first and second locking element when concurrently the first locking element is engaged by the first actuator and the second locking element is engaged by the second actuator.

In an alternate embodiment such a telescoping locking mast further comprises a locking element extension capable of engaging both of the first and second locking elements. In an embodiment of such a telescoping locking mast the first and second locking elements are locking rings that generally circumscribe the inner mast element; the engagement of the first or second actuator with the first or second locking ring tends to alter the circumference of the locking ring; and the locking element extension can engage each of the first locking ring and the second locking ring in a manner cooperative with the engagement of the locking ring by the actuator.

In an alternate embodiment, the telescoping locking mast further comprises a drive mechanism for positioning the first actuator. In an embodiment the drive mechanism is a screw drive. In an alternate embodiment the drive mechanism comprises a power-take-off from a drive mechanism used to extend the mast segments relative to one another.

BRIEF DESCRIPTION OF THE DRAWINGS

FIG. 5 shows a perspective of the outer mast segments separated from the other components. FIG. 5A shows the outer mast segments connected together, while FIG. 5B shows them separated.

FIG. 6 shows the locking actuator ring and the screw drive separated from the other components. FIG. 6A shows a perspective view while

DETAILED DESCRIPTION OF PREFERRED EMBODIMENTS

Figure 2:
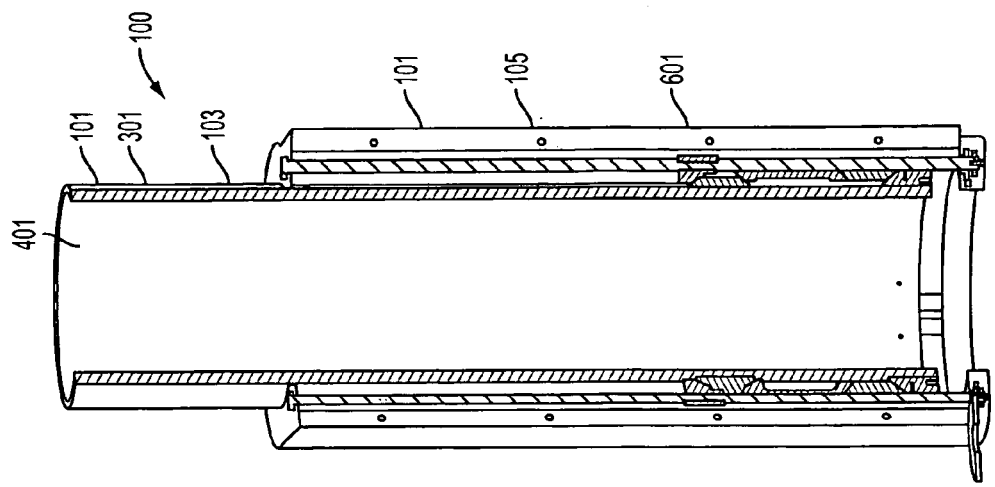
FIG. 2 shows a cut-through of FIG. 1.
Figure 1:
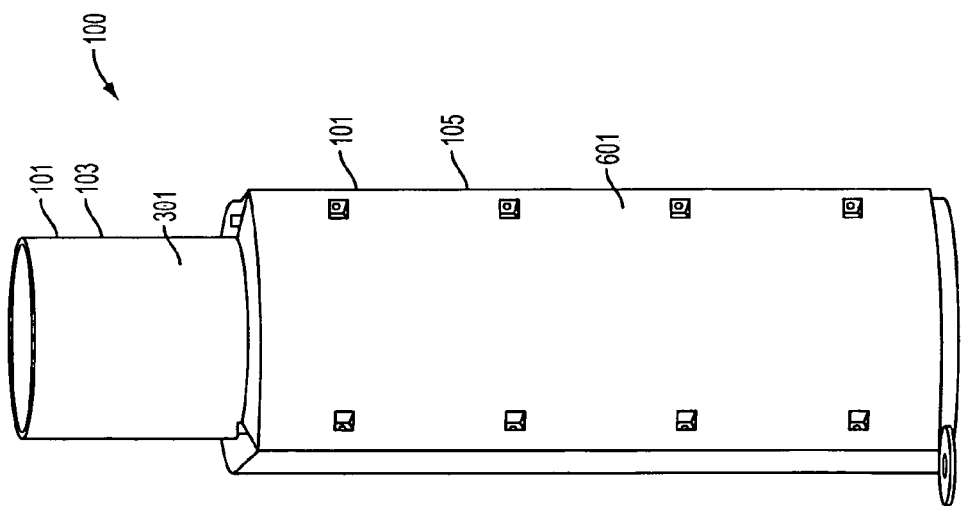
FIG. 1 shows a perspective view of the exterior of an embodiment of a continuously locking mast system.
Figure 4:
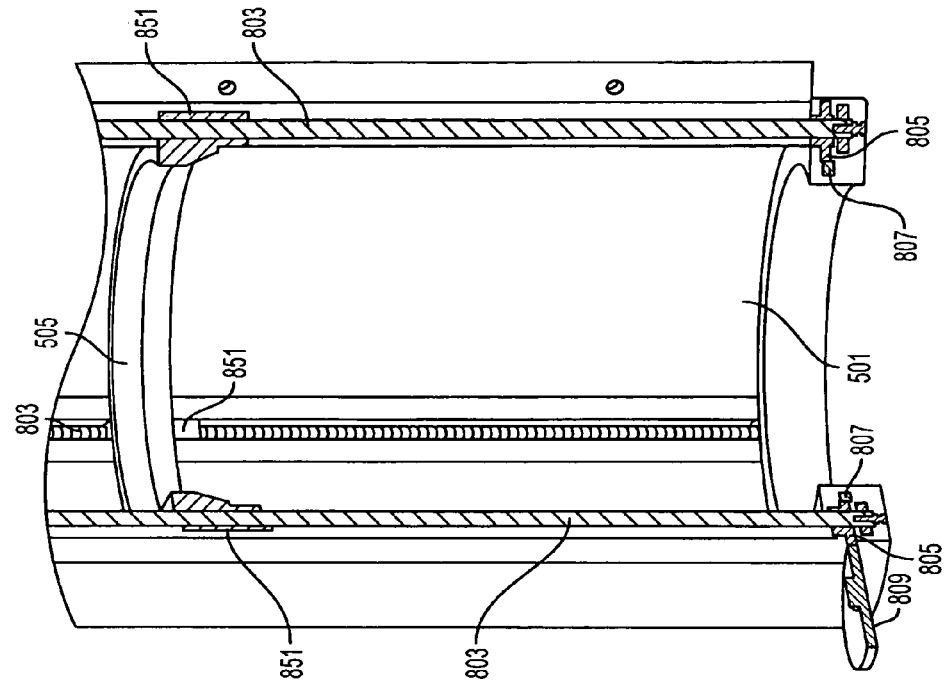
FIG. 4 shows a detail view of the embodiment of FIG. 3 with the inner segment and other components removed so as to make the screw drive visible.
Figure 3:
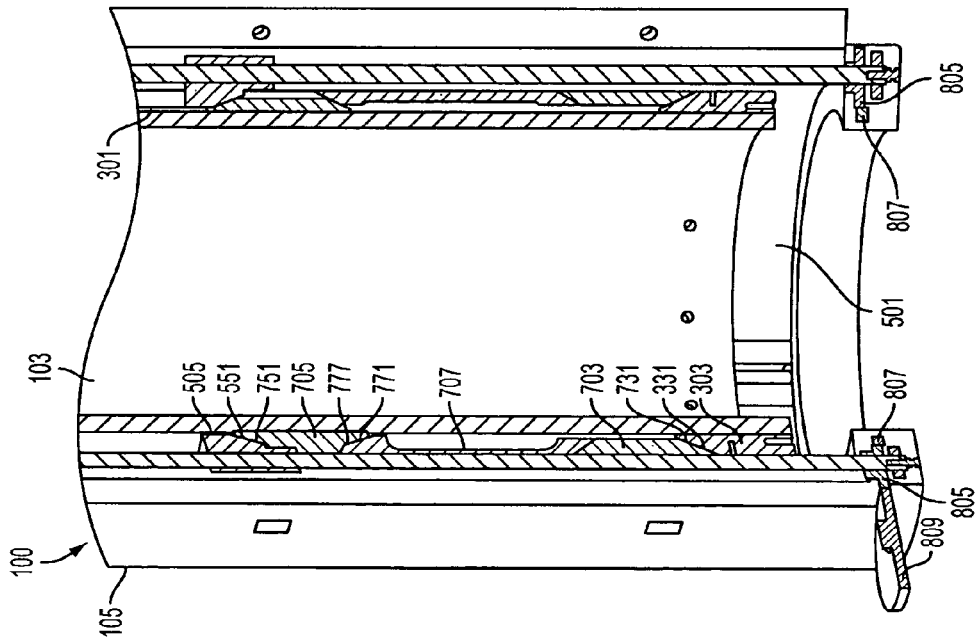
FIG. 3 shows a detail view of the embodiment of FIG. 2 to show the locking mechanism.

FIGS. 1-6 show an embodiment of a telescoping mast which uses an adjustable locking actuator to provide for locking of two adjacent mast segments at a plurality of points of extension relative to each other. This adjustable locking system may allow locking to occur along a contiguous range of positions of mast extension, in which case it is referred to as being "continuous locking."

For purposes of this disclosure, mast segments are considered to be locked in a position when adjacent mast segments have very little, if any, ability to move laterally relative to each other under ordinary conditions. Such lateral stability can be provided, for example, when two adjacent segments are connected at a minimum of three approximately equally spaced points around the circumference of the smaller, interior segment. In addition to lateral stability, in the locked position the mast generally will be prevented from at least one of either further extension or collapse. Adjacent segments are considered locked even though they can be unlocked simply by moving the mast segments, relative to one another, even if only slightly, such as by moving the segments relative to one another along the direction of extension or collapse opposite to the direction against which mast movement is locked.

The mast (100) of the depicted embodiment generally comprises at least two segments (101), one of which is arranged to be nested inside of the other, each of which may be designed to further nest inside additional segments or have additional segments nest inside it. For the purposes of the present discussion, the variable locking system is described simply in connection with two adjacent segments. This variable locking system can be used in conjunction with any two adjacent segments in a nested mast design, and can be used in conjunction with each pair of adjacent segments in a nested mast. To simplify this discussion, two segments are shown separated from any additional segments, to wit, an inner segment (103) nests in an adjacent outer segment (105). The outer segment (105) is preferably the lowest (largest) segment of the mast, but that is by no means required. Further, in this disclosure the telescoping extension will be discussed in relation to inner segments being raised vertically upward from within outer segments. This selection of direction and segment size is arbitrary and is done solely for the purpose of providing specificity to the discussion so that it is easier to understand, and should not be used to limit this disclosure. Moreover, the segments and the components of the locking system are shown as manufactured of metal, however, plastics, ceramics, composites, and many other structural materials are suitable, and not all components or all segments need be constructed of the same material.

The inner segment (103) comprises a standard tubular section, which is hollow to allow more inner tubular segments to slide therein. The inner segment (103) is generally cylindrical in shape, but such shape is by no means required. In alternate embodiments, the inner segment (103) may have any cross sectional shape. The inner segment (103) includes an outer surface (301) and an inner surface (401). The inner surface (401) is sized and shaped to accept additional segments nested therein, if such segments are used; none are shown here.

The outer segment (105) comprises three sections (591), (593), and (595) which are assembled together to produce a generally cylindrical internal shape that generally matches the generally cylindrical shape of the outer surface (301) of the inner segment (103). The sections (591, 593, and 595) may be held together by any appropriate means, such as screws, an adhesive, or any other connecting mechanism. The outer segment (105), when assembled, creates an inner surface (501) that, while being of the same general shape, is of slightly larger surface area than the outer surface (301) of the inner segment (103). The outer segment also has an outer surface (601). As the outer segment (105) is the lowest segment of the mast, the outer surface (601) serves as the outer surface for the mast when it is in its collapsed configuration. In alternate embodiments, the outer segment (105) is a single section, as with the inner segment (103). Further, in alternate embodiments, the outer segment (105) does not provide the outer surface of the mast when the mast is collapsed, but is an inner segment within another segment of the mast.

Within the space between the inner segment (103) and outer segment (105) is located a lower locking ring (703), an upper locking ring (705), a locking ring extension (707), a lower actuator (303), and an upper actuator (505), which together serve as a variable locking mechanism for the mast. Each of the locking rings (703) and (705) generally comprises a split ring with the ability to have its circumference increased or decreased by the application of an appropriate force. One of ordinary skill in the art will recognize that a variety of numbers of locking rings may be used depending on the configuration of the locking mast system, including using just one locking ring or more than two locking rings. Further shapes other than a ring can be used.

Towards the lower end of the inner segment (103) and on its outer surface (301), there is included a lower actuator (505). The actuator (505) comprises a continuous ring about the inner segment (103), and includes a slanted face (331) on its upper portion. The slanted face (331) is arranged to face away from the inner segment (103), i.e., the elevation of the slanted face (331) decreases as a function of increasing radial distance from the center of the mast. However, in another embodiment, the angle of the slanted face (331) may be changed to appropriately interact (as generally described below) with other parts of the locking mechanism. The lower actuator (303) is moved in the direction of extension of the mast by connection to the inner segment (103).

As depicted, the lower locking ring (703) is designed to be compressed against the inner surface (501) of the outer segment (105) when the system is locked. In particular, the lower portion of the lower locking ring (703) includes a slanted face (731) that is designed to mate with the slanted face (331) of the lower actuator (303) in such a manner that if the lower locking ring (703) is generally prohibited from upward movement, the lower locking ring (703) will be expanded outward to have a larger circumference as a result of an upward force transmitted through the mating faces (731 and 331) by the lower actuator (303). The expanded circumference of the lower locking ring (703) results in the lower locking ring (703) pressing into the inner surface (501) of the outer segment (105) as the inner segment (103) and lower actuator (303) continue to move slightly upward. The lower locking ring (703) is sized and shaped so that the lower actuator (303) cannot move completely past the lower locking ring (703) in an upward direction as the lower locking ring (703) has sufficient width to contact the inner surface (501) of the outer segment (105) before expanding to a diameter sufficient to allow the lower locking actuator (303) to pass through its inner diameter. Therefore, the lower locking ring (703) and lower actuator (303) will bind together against the inner segment (103) and the outer segment (105) with application of sufficient force.

The locking ring extension (707) is designed to move with the lower locking ring (703) when the lower locking ring (703) is engaged therewith. The extension (707) need not be separable from the lower locking ring (703), and is not required to be present in other embodiments of the invention. The extension (707), however, is preferred because it allows for a generally more secure and rigid connection between mast segments when in the locked position.

The extension (707) has a slanted face (771) on its upper portion that is generally directed away from the inner surface (501) of the outer segment (105), i.e., the elevation of the slanted face (771) increases with increasing radial distance from the center of the mast. This slanted face (771) interfaces with a corresponding face (777) located on the lower portion of the upper locking ring (705). The upper locking ring (705) includes a slanted face (751) on its upper portion which interacts with a corresponding slanted face (551) on the lower portion of the upper locking actuator (505).

When the upper locking ring (705) is pushed upward and engaged with the upper actuator (505), and when the upper actuator (505) is prohibited from upward movement, the upper locking ring (705) will be compressed, through transmission of the upward force across the interacting faces (551 and 751), thereby decreasing its circumference to the extent that it comes into frictional contact with the outer surface (301) of the inner segment (103) in an analogous manner to the binding of the lower locking ring (703) against the outer segment (103) when pushed by the lower actuator (303). Similarly, the upper locking ring (705) is sized and shaped so that it cannot push past the upper actuator (505) when moved upward.

So when the inner segment (103) is raised vertically, the rings (703) and (705) and the extension (707) are pushed upward by the lower actuator (303), through action of the lower actuator (303) on the lower locking ring (703). The lower locking ring (703) acts on the extension (707), which in turn acts on the upper locking ring (705), each piece being moved upward with the movement of the inner segment (103). When the inner segment (103) reaches a certain height, the upward movement of the locking rings (703) and (705) is inhibited by the upper actuator (505), the position of which has been fixed (as discussed below), and the diameter of the locking rings (703) and (705) begins to change due to the simultaneous interaction of the various, above-described faces and the continued, though slight, upward movement of the inner segment (103). The respective changes in diameter continue until the rings (703) and (705) have both become bound with the associated actuators (303) and (505) and segment surfaces (301) and (501), thereby locking the two segments (103) and (105) from further extension relative to one another.

As the space between the two actuators (505) and (303) decreases (with the continued upward movement of the inner segment (103)), the locking rings (703) and (705) are pushed into either the inner surface (501) of the outer segment (105) or the outer surface (301) of the inner segment (103). First, the slanted face (331) on the upper portion of the lower actuator (303) is pushed into a mating slanted face (731) on the lower locking ring (703). Through engagement of the upper slanted surface of the lower locking ring (703) with the lower slanted surface of the extension (707), the extension (707) is moved upward until the upper slanted face (771) of the extension (707) engages the lower slanted face (777) of the upper locking ring (705). When a certain extension of the inner segment (103) has occurred, the slanted face (751) on the upper portion of the upper locking ring (705) engages the slanted face (551) on the lower portion of the upper actuator (505). Through interaction of the various faces of the actuators (303 and 505), the locking rings (703 and 705), and the extension (707), the force tending to extend the mast segments (103) and (105) relative to one another is transferred to the locking rings (703) and (705) to change the circumference thereof, as discussed above. Due to the change in circumference, the rings (703) and (705) are pushed against their respective segments (105) and (103), binding the segments (103) and (105), and forming a relatively rigid connection therebetween. The mast is thus locked. To release the mast from this locked position, the inner segment (103) is simply lowered, which allows the reversal of the above-described sequence of interactions, releasing the lock.

In an embodiment, the continuously variable locking between the two segments (103) and (105) is accomplished by allowing for the positioning of the upper locking actuator (505) relative to the outer segment (105). By varying the positioning of the upper locking actuator (505), the mast extension position at which locking occurs is variable, since, as described above, locking occurs based on the fixed position of the upper locking actuator (505). In an alternate embodiment, the role of the upper and lower actuators (303 and 505)

in the locking process may be reversed, such that mast locking may be made dependent upon the fixed positioning of the lower actuator (303).

In the depicted embodiment, the upper locking actuator (505) is positioned by use of a parallel screw drive (801) connected to the outer segment (105). The screw drive (801) is comprised in part of three screw rods (803) positioned in an opening or groove (551) located at the intersection of adjacent sections (591), (593), and (595) of the outer segment (105). The upper locking actuator (505) is engaged with the screw rods (803) via a screw interface (851).

Figure 6B:
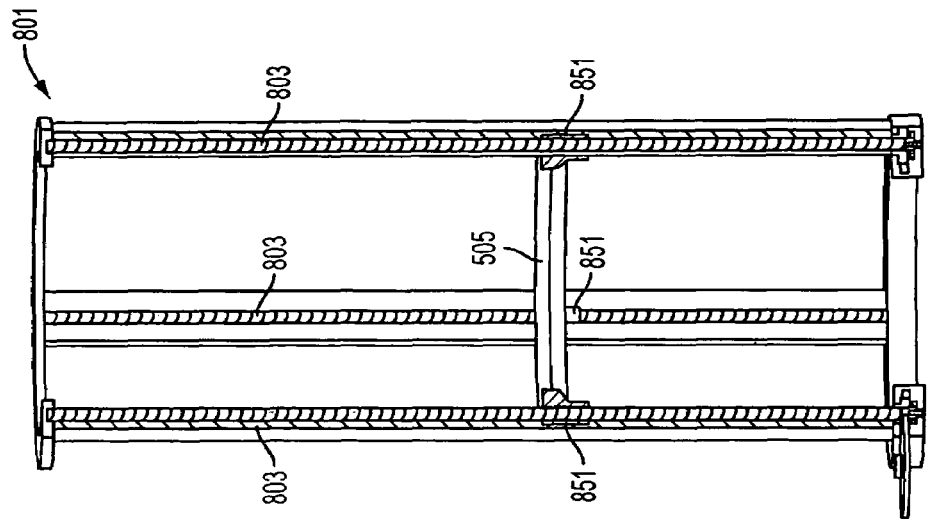
FIG. 6B shows a cut-through view.

As best shown in FIG. 6, the screw drive (801) comprises three separate screw rods (803) which are attached to three different screw interfaces (851) located on the upper locking actuator (505), generally positioned in a relatively equal distribution about the circumference of the outer segment (105). Three screw rods (803) are not necessary in all embodiments but the use of multiple screw rods (803) is preferred to allow for the upper locking actuator (505) to maintain a fixed position relative to the outer segment (105) when the upper locking actuator (505) is under pressure from the upper locking ring (705). Equal distribution of a sufficient number of screw rods (803) provides for even distribution of force between the screw rods (803) and screw interfaces (851), and helps to inhibit deformation of the upper actuator (505) while under pressure.

The screw rods (803) rotate in place, having external helical threads that interact with internal helical threads of the screw interface (851), so that as the screw rods (803) rotate in a first direction the upper actuator (505) is forced to move linearly either up or down, while rotation of the screw rods (803) in a second, opposite direction results in the opposite movement of the upper actuator (505).

Figure 6A:
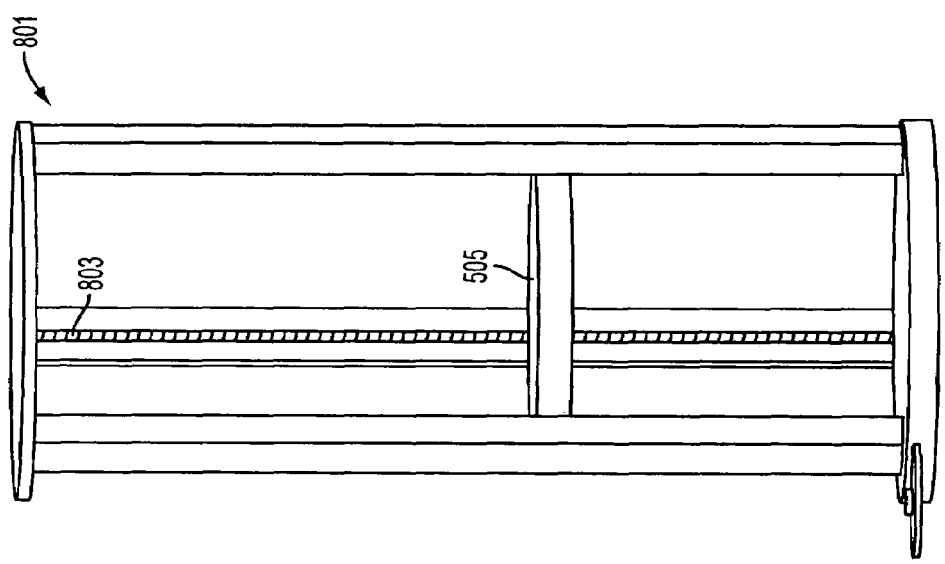

The rotation of the screw rods (803) is accomplished in the depicted embodiment through the connection of each rod (803) to a transfer gear (805) located at the rod's bottom end. All of the transfer gears (805) (one for each rod (803)) are then intermeshed with a large drive gear (807) located toward the bottom of the outer segment (105). As all the transfer gears (805) are simultaneously intermeshed with the same drive gear (807), all three rods (803) rotate at the same speed, smoothly moving the upper locking actuator (505) inside the outer segment (105) while maintaining its generally horizontal orientation. The drive gear (807) is connected to a drive mechanism, such as a motor or crank, by a gear train of which one gear (809) is shown in FIG. 6A. In an embodiment, the drive mechanism is a power-take-off from the motor or other drive mechanism used to raise the mast.

Since the position of the upper locking actuator (505) is controlled by the rotation of the rods (803) of the screw drive (801), the upper locking actuator (505) can be held in place by locking the gear train of the screw drive (801) in any manner known to one of ordinary skill in the art. In an embodiment, once the upper locking actuator (505) is in the desired position, a motor brake is applied to hold the upper locking actuator (505) in place. In an alternative embodiment, the upward force applied to the inner segment (103) and lower locking actuator (303) by the drive mechanism tending to raise the mast is offset by a downward force applied by the screw drive (801) to the upper locking actuator (505), providing a constant positioning of the upper actuator (505) based on cancellation of force.

By making the upper locking actuator (505) moveable and lockable along an essentially continuous range of positions relative to the outer segment (105), continuous locking of the mast is achieved. The upper locking actuator (505) can be moved to and stopped at virtually any position below the top of the screw rod (803) and above the lowest position obtainable by the upper locking ring (705) when the inner segment (103) is fully lowered.

The above discussion focuses on how to provide a continuous range of locking positions between the adjacent segments (103) and (105). To provide for additional mast height, additional segments are used in conjunction with segments (103) and (105). Such additional segments may be located inside the inner segment (103) or outside the outer segment (105), depending on the chosen design of the mast.

In an embodiment including a mast comprising more than two segments, more than one segment may include a continuous locking mechanism for allowing the segment immediately inside it to occupy a plurality of locking points. In an embodiment, all segments except the most inner segment comprise a continuous locking mechanism. This embodiment effectively is able to raise and lock the mast at any height between its minimum and maximum height. Due to the complete control of all segments' positioning, such a mast could have a large number of different configurations for achieving the same total height. Such an embodiment may be expensive to produce and of less than optimal practicality due to size, weight, or cost.

In an alternate embodiment, an arrangement with only a single continuous locking segment is used. The remaining segments can be locked only in their fully extended or fully collapsed positions. Each of the segments is then designed to be raised or lowered in a step fashion. In one such embodiment, the system is arranged so that a lower segment is fully extended before the next highest segment begins extending, thus raising the larger and stronger segments first. In such a design the continuous locking segments are preferably the lowest two, but that is by no means required. To raise the mast to a specified length, the length is first divided into the number of single position locking segments to be raised, and then the continuously locking segment provides for any amount which is less than the length of a single segment. For example, if each of 10 segments is 1 foot long, and the mast is to be raised 5 feet 2 inches, five one-position segments would be raised (5 feet) and the continuously variable section would raise 2 inches to provide for the remaining (less than 1 foot) value.

To put this in more general terms, if the continuously locking segments are the outermost (lowest) two, the system is raised to a desired height by raising an appropriate number of segments, from the third internal segment (the first with a single position locking) to the innermost internal segment, to their maximum extension. The thus-formed mast, comprised of the several maximally extended segments, is then raised by the continuously variable segment a variable distance to complete any fragmentary portion of extension.

One of ordinary skill understands that the continuously variable system need not be located on the lowermost segments, and can in fact be located on any segment. However, location of the continuously variable locking mechanism on the lowest segments is generally preferred, since that location allows for easier transmittal of power to the drive gear (807), without the need to raise the drive mechanism any distance on the mast (100), or provide for any type of drive train extension based on the height of the mast (100). Further, having the continuously locking system on a lower segment allows for the outer segment (105) to be the largest in the mast which can allow the screw rods (803) and other components of the locking mechanism to utilize more space, and thereby have more strength, since they generally can be constructed in larger dimensions than would be possible if a smaller segment was used to hold these components.

In embodiments of the continuously locking mast, the mast is telescopically extended by a collapsible chain erection mechanism. In an embodiment, the chain erection mechanism is comprised of at least two flexible chain assemblies, each constructed of serially interconnected links that are generally free to move in at least one dimension with respect to one another. In alternate embodiments, the serially interconnected links are generally free to move in at least two dimensions with respect to one another or are generally free to rotate with respect to one another about at least one axis, which is a point of connection between the two links. Generally in embodiments of the present invention, the chain assemblies are combined in a manner in which the links of one chain assembly are brought into close proximity and alignment with the links of another chain assembly, which allows the chain assemblies to interconnect through the interaction of their links in what is referred to herein as a zipper-like combination. In an embodiment, portions of the chain assemblies that have been combined in a zipper-like fashion form a generally rigid column, while unjoined portions of each chain assembly remain generally flexible with respect to rotation about an axis at which links are joined. In an embodiment, a rigid column so formed projects vertically, while in other embodiments the column may project in essentially any direction, not just vertically.

In an embodiment, a particularly beneficial feature of the rigid or semi-rigid column is the inclusion of space internal to the column within which one or more cables, such as power and communication cables, can be positioned. By including these cables within the column there is little chance for physical interference between the cable or cables and any of the components of the chain assemblies, a mast raised thereby, or with other nearby equipment. This intra-column cable management provides great benefit in terms of reduced chance of physical interference compared with the traditional arrangement where the cables are external to a mast.

In an embodiment, a cable conduit is attached to at least some of the links of a chain assembly such that the conduit does not move significantly with respect to the chain assembly or the links thereof as the column is erected. In such an embodiment, the conduit provides a protected space within which cables can be positioned. In an alternate embodiment, no conduit is present, and a cable or cables are similarly fixedly connected to the links of the chain assembly.

Figure 7:
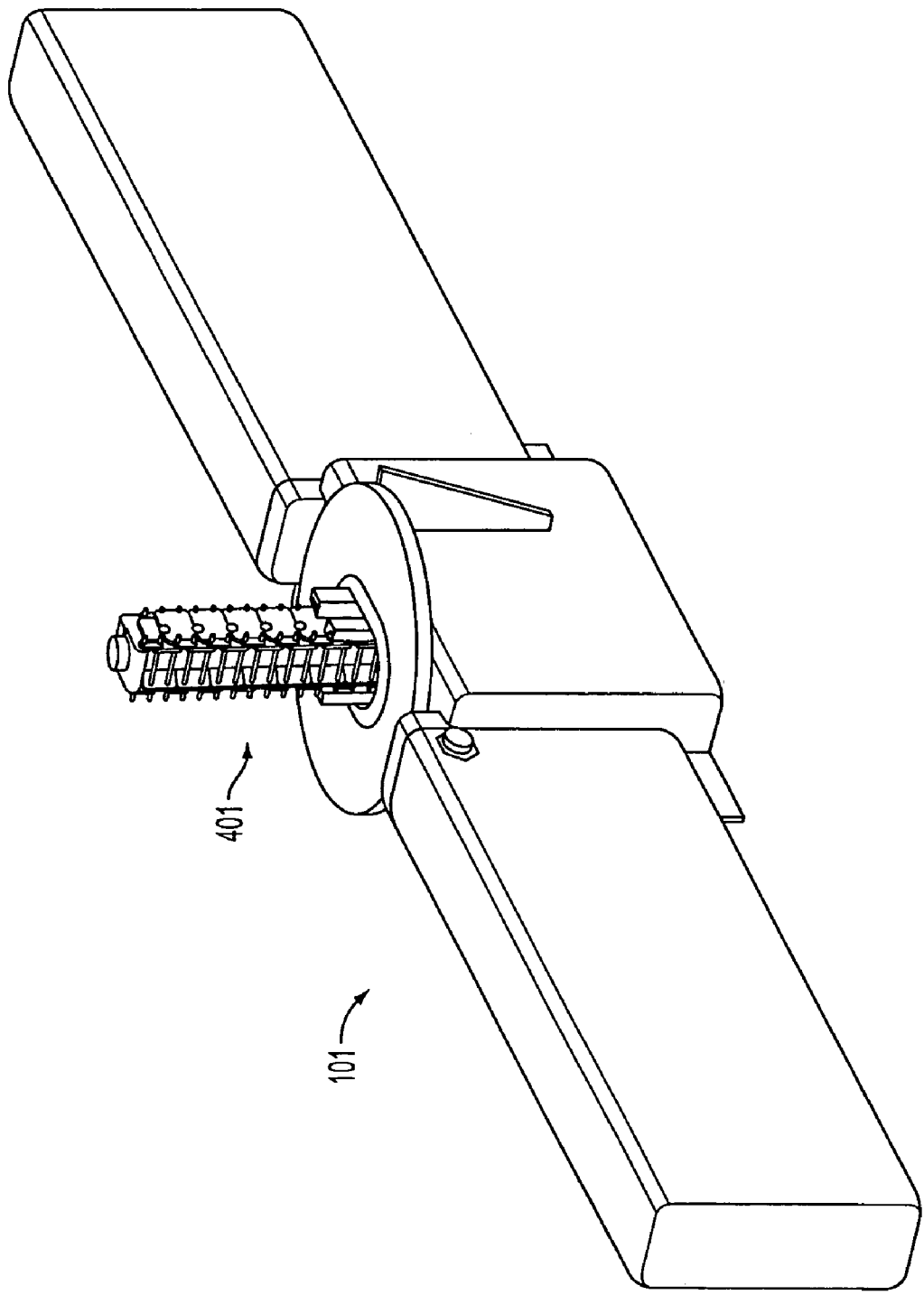
FIG. 7 shows a perspective view of a first embodiment of a chain lift system having a button and notch interlinking of chain assemblies.
Figure 8:
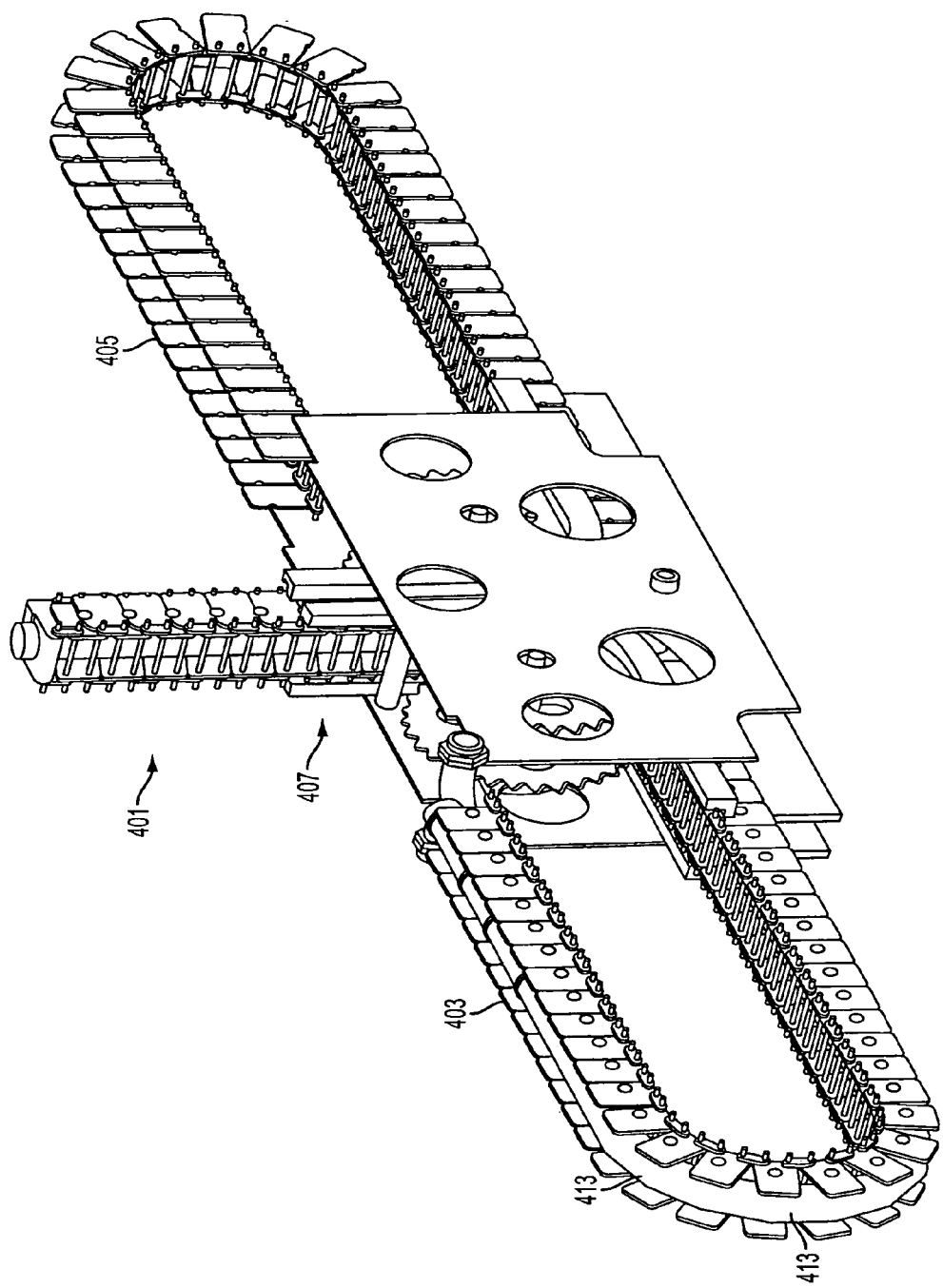
FIG. 8 shows a front perspective view of the embodiment of FIG. 7 with the covering enclosures removed for purposes of illustration.
Figure 9:
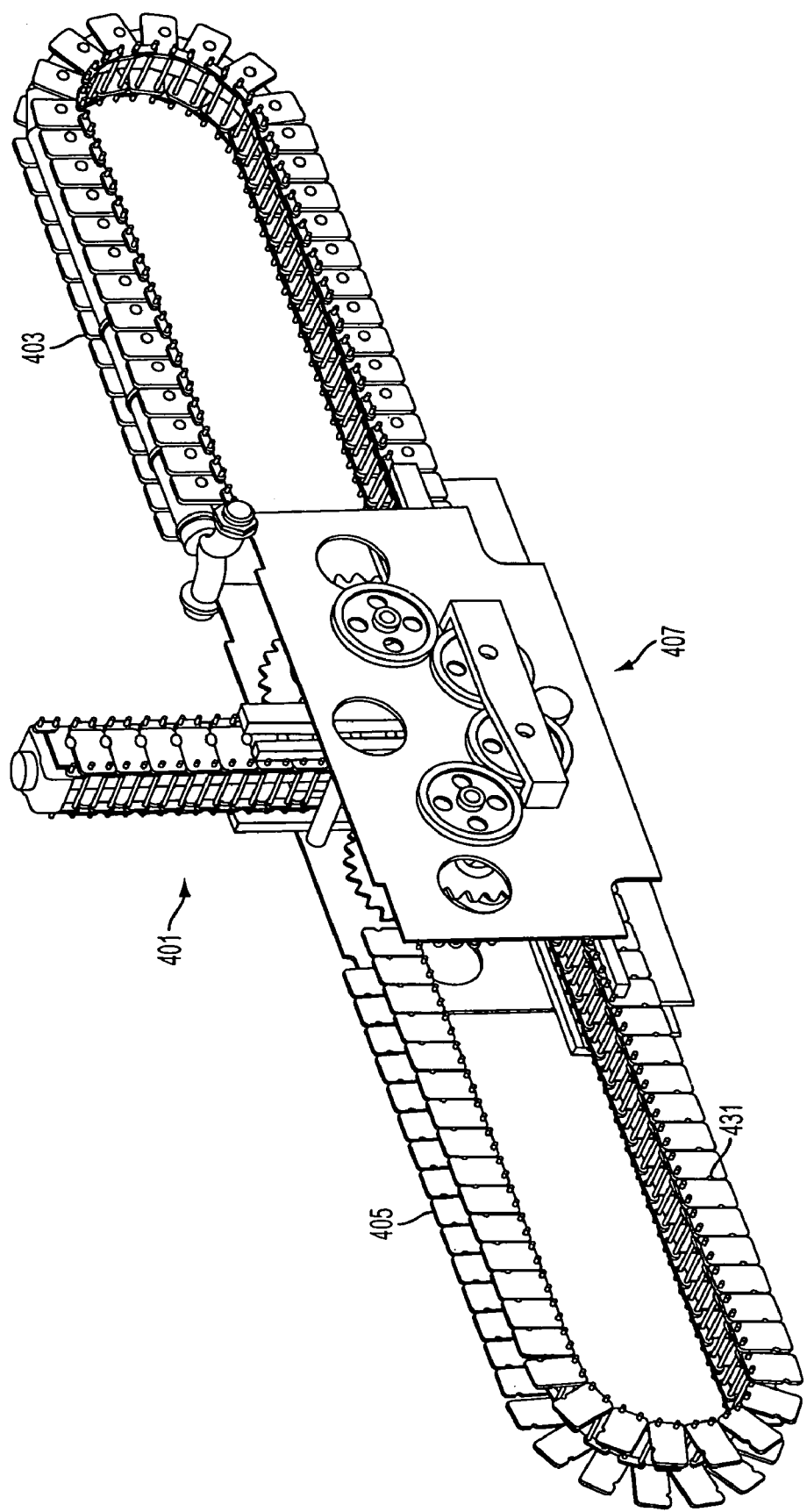
FIG. 9 shows a rear perspective view of the embodiment of FIG. 7 with the covering enclosures removed for purposes of illustration.

FIGS. 7-16 illustrate various portions of a first embodiment of the chain erection mechanism. FIG. 7 provides a rear view of a complete, enclosed chain lift system 101. The enclosure serves, in part, both to protect the internal components of the chain lift system 101 from outside interference and to protect the operators of the chain lift system 101 from undesirable interaction with the moving parts thereof. FIGS. 8-9 provide perspective views from the front and rear, respectively, of some of the internal components of the chain lift system 101, wherein the column 401 is in a state of partial vertical extension. A detailed description of these components will be presented below with reference to other figures.

A basic description of the configuration and operation of an embodiment of the chain erection mechanism is provided with reference to FIGS. 7-10. In FIGS. 7-9, the column 401 is mostly collapsed. In this embodiment, a fully collapsed column extends no higher than the highest point of the central assembly mechanism 407. With the column 401 in the collapsed position, two separate chain assemblies 403 and 405 extend generally horizontally in opposite directions from the central assembly mechanism 407, doubling back upon themselves generally in a vertical plane so as to extend horizontally from the assembly mechanism 407 a distance equal to about half of each chain assembly's total individual length. When the column 401 is in the collapsed position, portions of each of the two chain assemblies 403 and 405 near a first end of each meet and are joined in the assembly mechanism 407 forming a rigid vertical section of the column 401 having a height that does not protrude above the assembly mechanism 407. Since, in this embodiment, the assembly mechanism 407 does not collapse, there is little benefit to collapsing the column 401 to a height lower than the height of the assembly mechanism 407. Where the top of the column 401 is attached to a portion of a mast or to other equipment, it may not be practicable or even possible to collapse the column 401 further than the top of the assembly mechanism 407, or some height above that, such as the minimum height of the point of connection between the column 401 and the mast. At least in part for these reasons, the column 401 is not collapsed further in this embodiment, and the chain assemblies 403 and 405 remain joined at their first ends. In alternate embodiments, it may be possible and even desirable to further collapse the column 401, even to the extent that the chain assemblies 403 and 405 are completely separated from one another.

Figure 10:
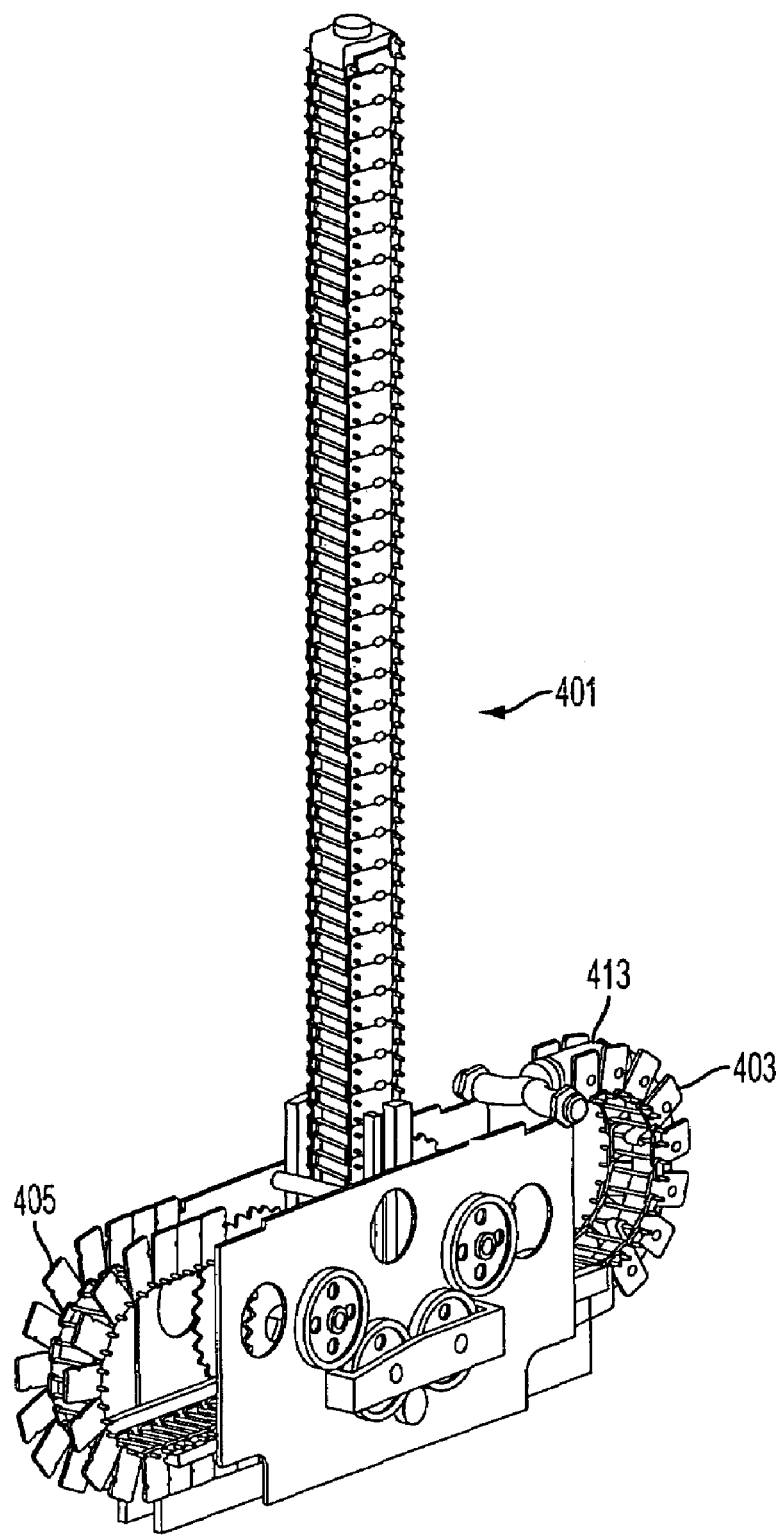
FIG. 10 shows a rear perspective view of the embodiment of FIG. 7 with the covering enclosures removed for purposes of illustration, wherein the chain is in an extended position.

FIG. 10 shows a mast in a substantially erected configuration. The chain lift system 101 has transitioned from the collapsed configuration to the substantially erected configuration through operation of the assembly mechanism 407. As the assembly mechanism 407 operates to produce the column 401, the two chain assemblies 403 and 405 are pulled toward the assembly mechanism 407 by a rotating gear system (shown and described with reference to FIGS. 14-16), forcing the two chain assemblies 403 and 405 to combine into the generally rigid column 401 as they are pushed in a vertical direction.

Figure 11:
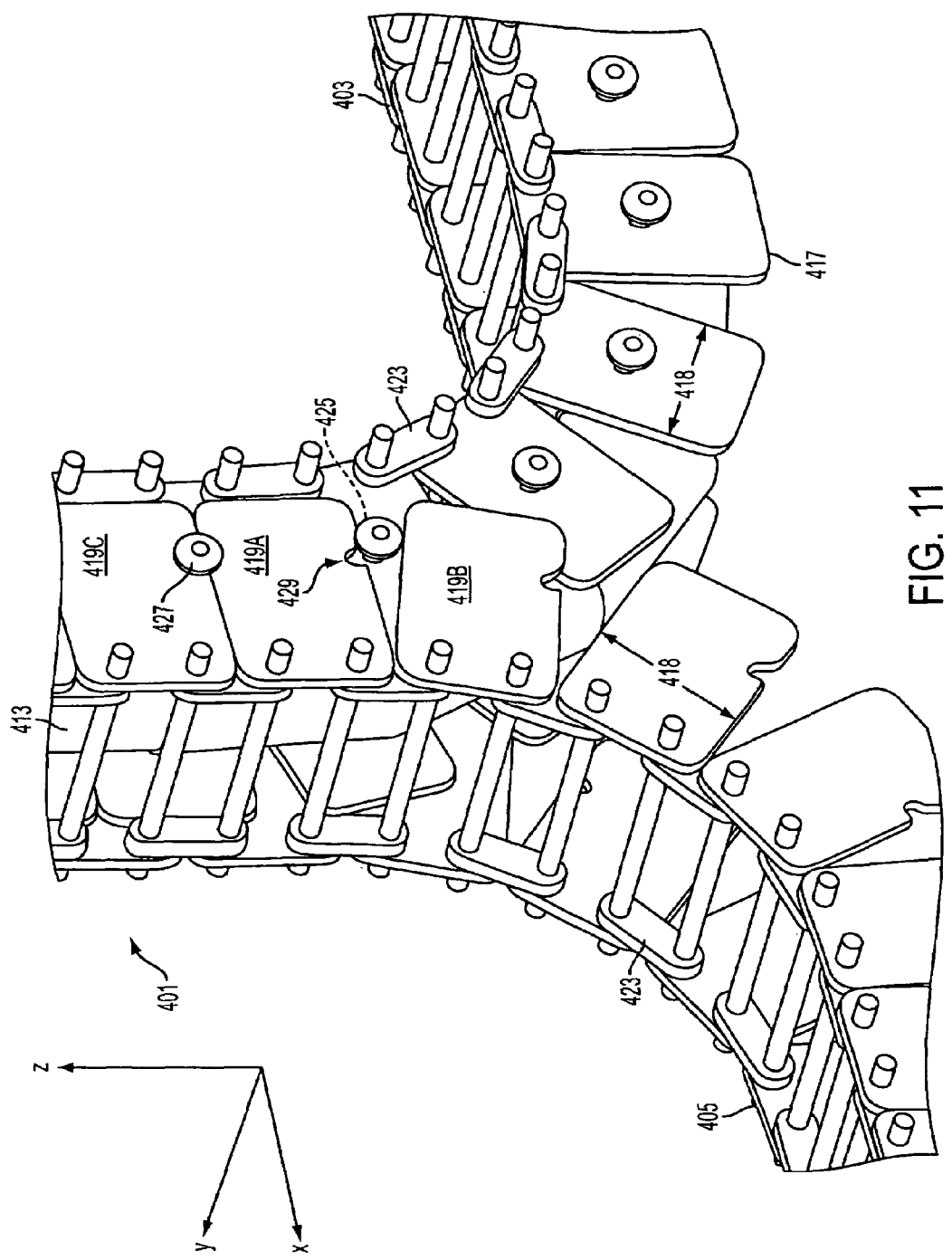
FIG. 11 shows a close-up view of a portion of the embodiment of FIG. 7.

FIG. 11 focuses attention on the chain assemblies 403 and 405 and their individual links, and helps to illustrate how the chain assemblies 403 and 405 zipper together to form a generally rigid column 401. FIG. 11 depicts an enlargement of the area where the chain assemblies 403 and 405 are joined to form the column 401, the assembly mechanism 407 having been artificially removed from the figure for purposes of illustration. The mechanism of interaction of the chain assemblies 403 and 405 in forming the column (as depicted in FIG. 11) will be described following a description of the components of the chain assemblies 403 and 405 depicted in FIG. 12.

Figure 12:
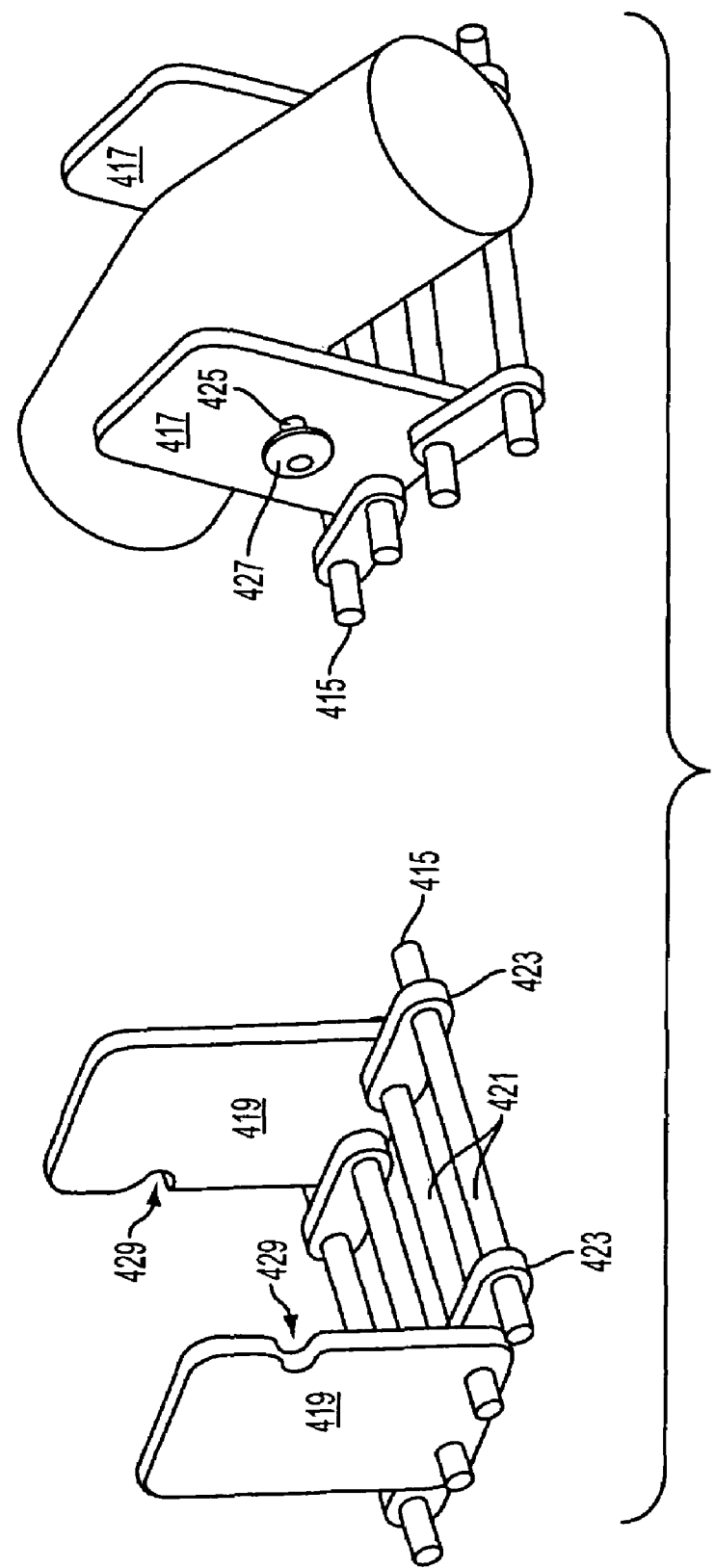
FIG. 12 shows a perspective view of components of the chain and cable assemblies of the embodiment of FIG. 7, the components shown separately from those assemblies for the purposes of illustration.

FIG. 12 shows the components of the chain assemblies 403 and 405 of this first embodiment in relative isolation. Each of the two chain assemblies 403 and 405 comprise roller links 415 and link plates 417 or 419. When these components are repeatably connected together in series, a chain assembly 403 or 405 is formed. As can be seen in FIG. 12, the roller links 415 are very similar for the two chain assemblies 403 and 405 of this embodiment, but the link plates 417 and 419 are distinctly different. In this embodiment, a connected series of inner link plates 417 and roller links 415 forms the inner chain assembly 403, and a connected series of outer link plates 419 and roller links 415 forms the outer chain assembly 405. The link plates 417 and 419 are the components of the chain assemblies 403 and 405 that interact to create the generally rigid configuration that is the column 401.

Still looking at FIG. 12, the elements of the roller links 415 and link plates 417 and 419 are described now. The roller links 415 are comprised of two parallel rods 421 connected by two cross bars 423 near each end of the rods 421. In this embodiment, the rods 421 and cross bars 423 used for each chain assembly 403 and 405 are of the same dimensions, but the cross bars 423 of the inner chain assembly 403 are positioned slightly further apart than are the cross bars 423 of the outer chain assembly 405. Both the inner and outer link plates 417 and 419 are generally rectangular in shape (in side elevation). The inner link plates 417 have a pedestal 425 projecting from the flat rectangular side. On top of the pedestal 425 rests a button 427. The outer link plates 419 have a rounded notch 429 through the entire depth of the outer link plate 419 at a position along the circumference thereof. In alternate embodiments each of these components may have other shapes, as is understood by one of ordinary skill in the art.

Each of the chain assemblies 403 and 405 are simply constructed as a series of connected roller links 415 and link plates 417 or 419. The inner chain assembly 403 is comprised of a series of roller links 415 connected by inner link plates 417, while the outer chain assembly 405 is comprised of a series of roller links 415 connected by outer link plates 419. The manner of the connection between roller links 415 and link plates 417 or 419 is as shown in FIG. 12. In both chain assemblies 403 and 405, the link plates 417 and 419 are connected to the roller links 415 by passing the rods 421 of the roller links 415 through holes in the link plates 417 and 419. In this embodiment the inner link plates 417 are positioned just inside the cross bars 423 of the roller links 415, while the outer link plates 419 are positioned just outside the roller link cross bars 423.

The structure of the column 401, wherein the chain assemblies 403 and 405 have been zippered, now can be described with reference to FIG. 11. It can be observed in FIG. 11 that the link plates 417 and 419 of the two chain assemblies 403 and 405 are offset from one another along the vertical dimension such that, while individual link plates 417 and 419 have equal vertical dimensions 418, the edges of the link plates 417 and 419 do not correlate at equal elevations when configured into the column 401. That is, from a side elevation view (in which the link plates appear as rectangles) a single outer link plate 419 partially overlaps two inner link plates 417, and visa versa. This vertical offset is of a magnitude that allows a pedestal 425 of an inner link plate 417 to align with a notch 429 of an outer link plate 419.

When the outer chain assembly 405 is moved into either horizontal or vertical alignment (or any other straight-line alignment), the sides of adjacent outer link plates 419 are immediately adjacent to one another. As a result of this adjacency, an unnotched side of an outer link plate 419 is positioned next to a notch 429 in the side of an adjacent outer link plate 419, and the notch 429 becomes an enclosed passage 431 (FIG. 9) through the depth of the two adjacent outer link plates 419. The notch 429 is formed in a size and shape so as to create an enclosed passage 431 having dimensions about the same as the external dimensions of the pedestal 425. In an alternate embodiment, the enclosed passage 431 is created through alignment of notches in each of the adjacent sides of two adjacent outer link plates 419, each outer link plate 419 having notches 429 in two sides.

The formation of the column 401, then, is a result of the interaction of the two chain assemblies 403 and 405 as each is moved into vertical alignment in positions adjacent to one another so that the link plates 417 and 419 can lock together as herein described. As shown in FIG. 11, the locking of the chain assemblies 403 and 405 occurs when a pedestal 425 of an inner link plate 417 moves into a notch 429 of a first outer link plate 419A and a second, adjacent outer link plate 419B moves into vertical alignment with the first outer link plate 419A forming an enclosed passage 431 through which the pedestal 425 passes. In this locked configuration, as shown by vertically aligned adjacent outer link plates 419A and 419C, the inner and outer link plates 417 and 419 are held fairly tightly together since the button 427, which overlaps two outer link plates 419A and 419C is connected by a pedestal 425 to an inner link plate 417, which also overlaps the same two outer link plates 419A and 419C. In this embodiment, when in the locked configuration, the outer link plates 419 are restrained from motion in the vertical dimension by adjacent outer link plates 419 (except as coordinated with both the chain assemblies 403 and 405, as in erection of the column 401), and restrained from motion in the horizontal dimension by at least one of the inner link plate 417, button 427, or pedestal 425.

The illustration of FIG. 11 shows the alignment of the link plates 417 and 419, particularly with respect to each other and with respect to the roller link cross bars 423. Each of the components of the chain assemblies 403 and 405 discussed here has an outer surface that faces away from the cable assembly 413, and an inner surface that faces towards the cable assembly 413 along the horizontal y-dimension, as labeled. It is observed that the inner surface of the outer link plates 419 contact the outer surface of the cross bars 423 of the outer chain assembly 405 on the outer surface of these cross bars 423, that the outer surface of the inner link plates 417 contact the inner surface of the outer link plates 419, and that the pedestal 425 is of a length such that the inner surface of the button 427 is in contact with the outer surface of two adjacent outer link plates 419. Through the interlinking of the chain assemblies 403 and 405, as described above and shown in detail in FIG. 11, the two chain assemblies 403 and 405 are held together in the generally rigid configuration of a column 401 that is relatively stable with respect to forces that may tend to disrupt the organized vertical structure of the column 401.

As stated above, in an embodiment, the cable management feature of the chain lift system is particularly beneficial. As seen in many of the FIGS. already described, including FIGS. 8 and 9, the cables that may be power, communications, or other types of cables connected, for instance, between a load at the top of a mast raised by the column 401 and other equipment at the bottom of the column 401, can be positioned inside the link plates 417 and 419 of the column 401. Also shown in FIGS. 8 and 9, the cable assembly 413 continues to run along the length of the portion of one of the chain assemblies 403 or 405, preferably along the inner chain assembly 403, that is separated from the other chain assembly 403 or 405 and is positioned generally horizontally extended from the assembly mechanism 407.

In alternate embodiments, the cable assembly 413 may be comprised of any of a single wire or cable, a bundle of wires or cables, a flexible conduit through which may pass a wire or cable or a bundle of wires or cables, or some combination thereof. In a further alternate embodiment, a cable assembly 413 may be connected to more than one chain assembly 403 and 405. Additionally, in an embodiment, the cable assembly 413 is assembled with the chain assemblies 403 and 405 at the assembly mechanism 407 and does not remain connected to a chain assembly 403 or 405 when that chain assembly 403 or 405 is separated from the other chain assembly 403 or 405 as the column 401 is collapsed.

Figure 13:
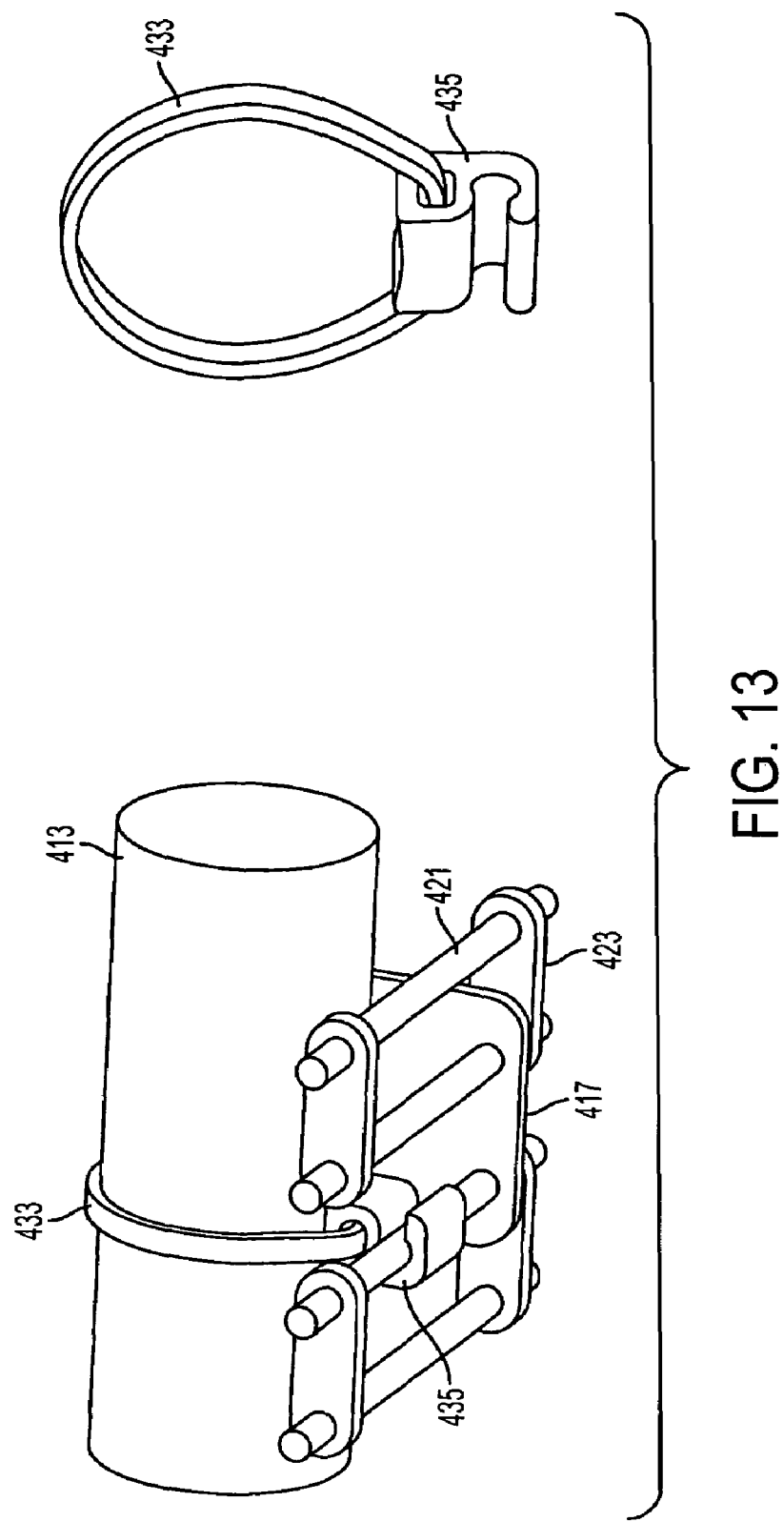
FIG. 13 shows a perspective view of components of the chain and cable assemblies of the embodiment of FIG. 7, the components shown separately from those assemblies for the purposes of illustration.

FIG. 13 shows how the cable assembly 413 is attached to a chain assembly, such as chain assembly 403, in an embodiment. A standard tie-wrap 433 is passed through a link attachment 435 and around a cable assembly 413. The tie-wrap 433 holds the cable assembly 413 securely to the link attachment 435. The link attachment 435 holds the cable assembly 413 to a chain assembly 403 or 405 through connection to a rod 421 of a roller link 415. In the depicted embodiment, the link attachment 435 is a hook. In alternate embodiments either of the tie-wrap or the link attachment or both is a strap, an adhesive, a screw or any other appropriate attaching mechanism. The depicted connection of the cable assembly 413 to the chain assembly 403 or 405 allows a certain amount of flexibility and rotation among each of the components that are so attached. This flexibility in the connection of the cable assembly 413 to the chain assembly 403 allows a fairly easy transition around a bend as the chain assembly 403 moves from the horizontal to the vertical dimensions. Of course, other methods of connection between the cable assembly 413 and the chain assembly 403 or 405 are also contemplated.

Figure 14:
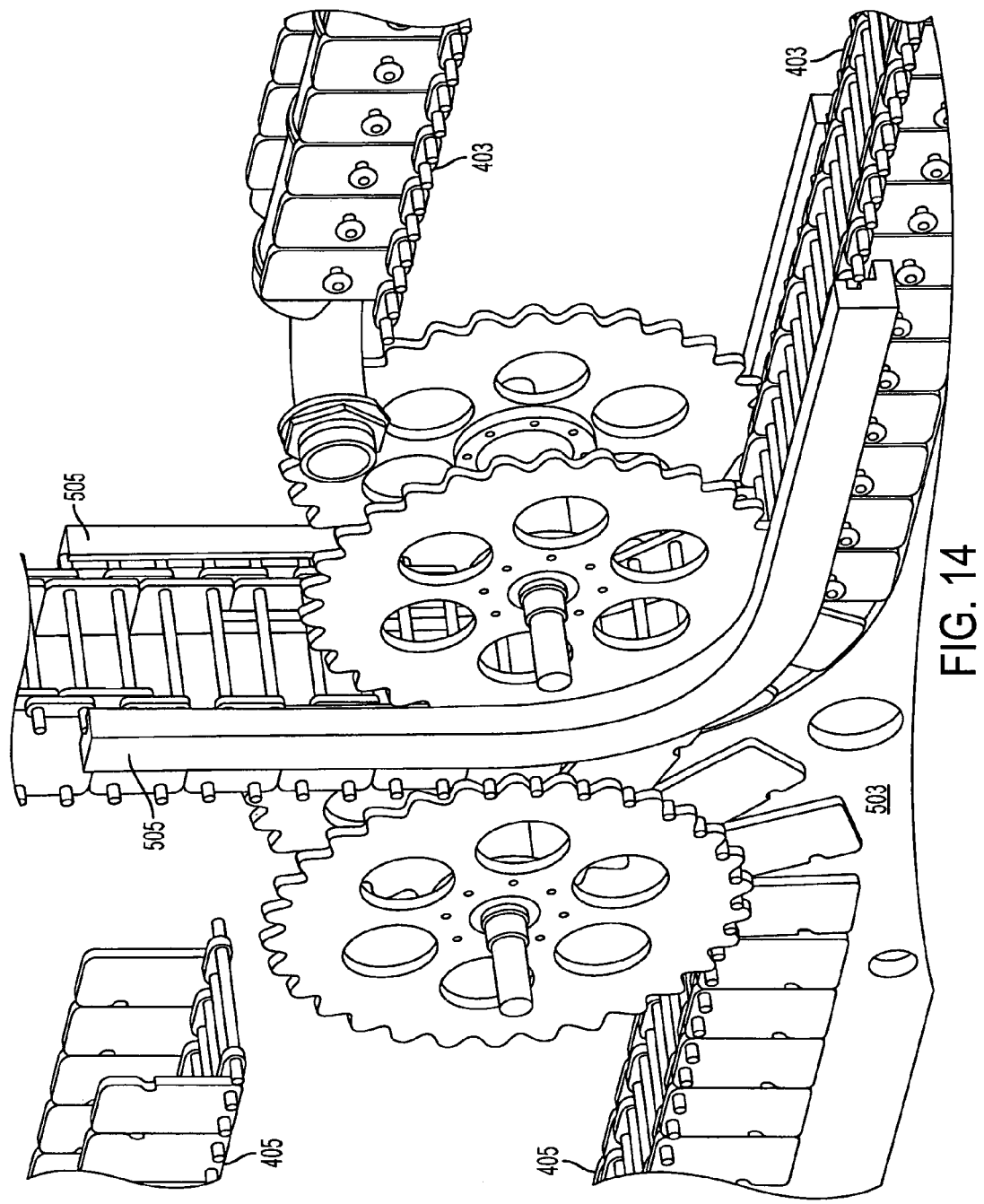
FIG. 14 shows in a perspective view of embodiments of components of the chain and cable assemblies with several drive sprockets, a guide plate, and a roller link guide, some of the chain assembly components having been removed for purposes of illustration.
Figure 15:
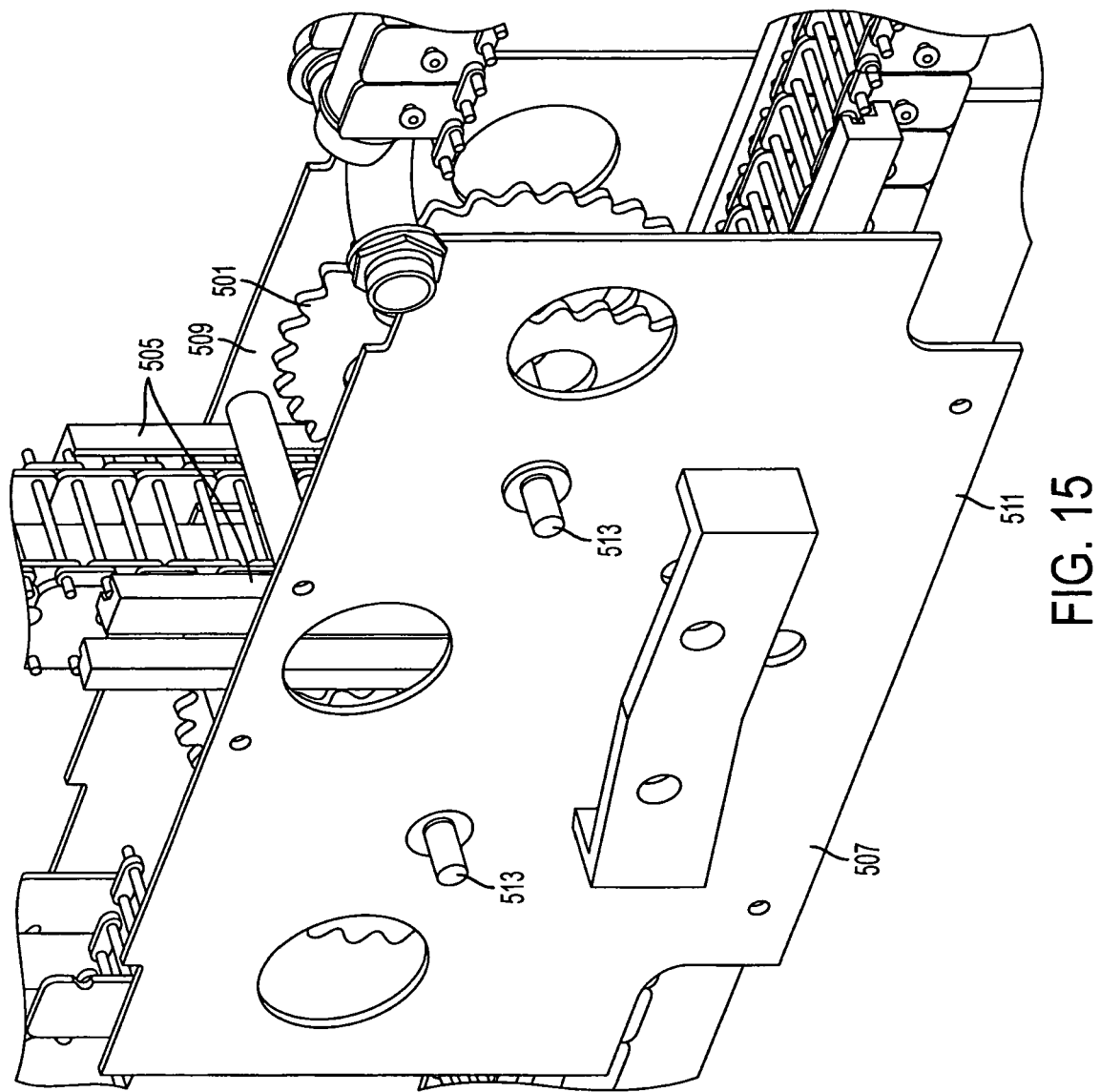
FIG. 15 shows an alternate perspective view from that of FIG. 14 with the addition of some components of the drive mechanism.
Figure 16:
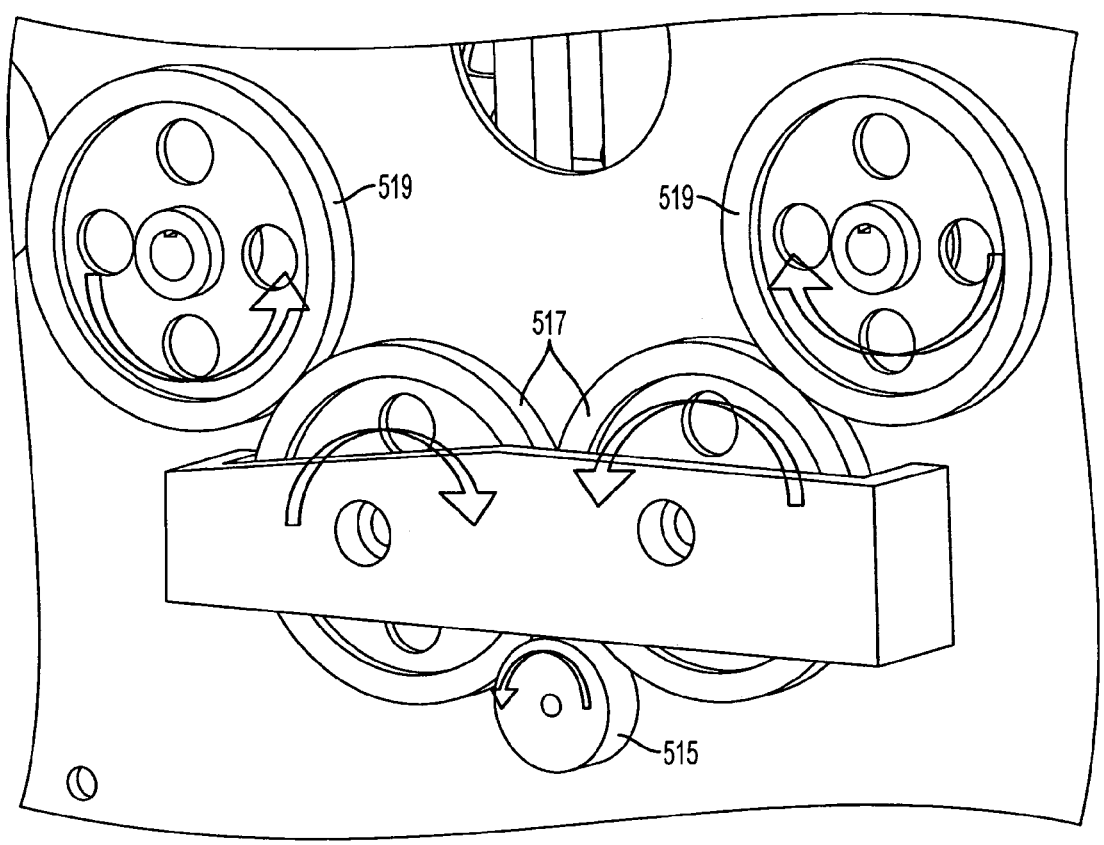
FIG. 16 shows a close-up perspective view of components of the drive train of an embodiment of a chain lift system.

FIGS. 14-16 illustrate various aspects of an assembly mechanism 407 as may be used in a chain lift system 101. FIG. 14 shows several drive sprockets 501, which engage the chain assemblies 403 and 405 in order to move the chain assemblies 403 and 405 from a horizontal configuration to a vertical configuration for erecting the column 401. As shown in FIG. 14 the drive sprockets of this embodiment engage the ends of the roller link rods 421 through toothed engagement, and since each of the roller links 415 is connected to the other roller links 415 of a chain assembly 403 or 405, the drive sprockets can effect movement of the entire chain assembly 403 or 405. FIG. 14 shows the configuration, in an embodiment, of four drive sprockets 501, two drive sprockets 501 engaging each of the two chain assemblies 403 and 405 at each end of the roller link rods 421.

Components that guide the motion of the chain assemblies 403 and 405 are also shown in FIG. 14. FIG. 14 illustrates the guide plates 503, which assist in providing consistent positioning of the chain assemblies 403 and 405 through interaction and guidance of the link plates 417 and 419. FIG. 14 also illustrates the roller link guides 505, which assist in positioning the chain assemblies 403 and 405 through interaction and guidance of the roller links 415. Both of these guides, guide plates 503 and roller link guides 505, help to maintain smooth, consistent motion of the chain lift system 101 during the raising and lowering of the column 401.

FIG. 15 illustrates a support structure 507 for the assembly mechanism 407 of the chain lift system 101. This support structure 507 is comprised of a front plate 509 and a rear plate 511, of similar generally rectangular shape. FIG. 15 also generally illustrates the connection of the axles 513 of the sprockets 501 to the support structure 507. Other support structures are contemplated as would be obvious to one of ordinary skill in the art.

FIG. 16 shows a gearing system of an embodiment comprising a pinion 515 connected to two idler gears 517, which are, in turn, connected to two drive gears 519. The connection of the pinion 515 to the idler gears 517 allows the direction of rotation of the pinion 515 to be transferred to one of the two idler gears 517, and the opposite direction of rotation to be transferred to the other of the two idler gears 517. In this way opposite rotations are communicated to the drive gears 519, which are connected to the idler gears 517. The drive gears 519 are connected to the axles 513 of the sprockets 501, which are in turn connected to the chain assemblies 403 and 405. So, as the drive gears 519 are moved, the sprockets 501 move, and in this way effect the raising and lowering of the column 401. That is, during rotation of the pinion 515 in one direction, through their opposite rotation, the drive gears 519 enable the chain assemblies 403 and 405 to be pushed together in the assembly mechanism 407, effecting the zippering that creates the column 401. An opposite rotation of the pinion allows the column 401 to be collapsed.

The drive gears are moved when rotation is communicated from the pinion 515 through the idler gears 517 to the drive gears 519. The pinion 515 is moved by a force external to the embodiment shown. The force can be provided by any reasonable method of generating rotational motion in the pinion 515, including an engine, a motor, or by hand, such as by hand crank. In an alternate embodiment of the chain lift system 101, a force generating mechanism for causing the rotation of the pinion 515 is comprised within the chain lift system 101, itself. In an embodiment wherein the chain lift system 101 is mounted on a vehicle, the force generating mechanism is a power-take-off from the device used to power the vehicle, such as an engine or motor.

Figure 17:
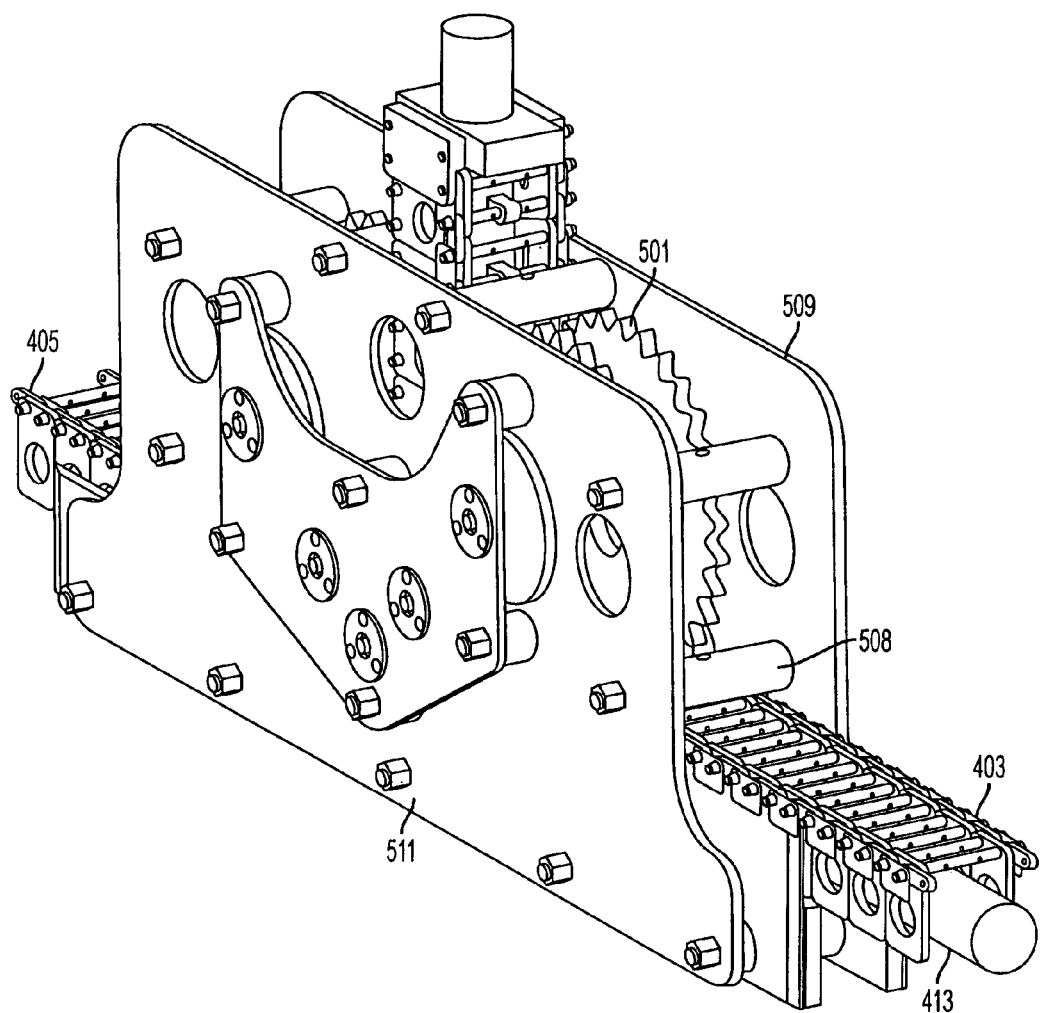
FIG. 17 shows a rear perspective view of an assembly of many of the components of a second embodiment of a chain lift system.
Figure 18:
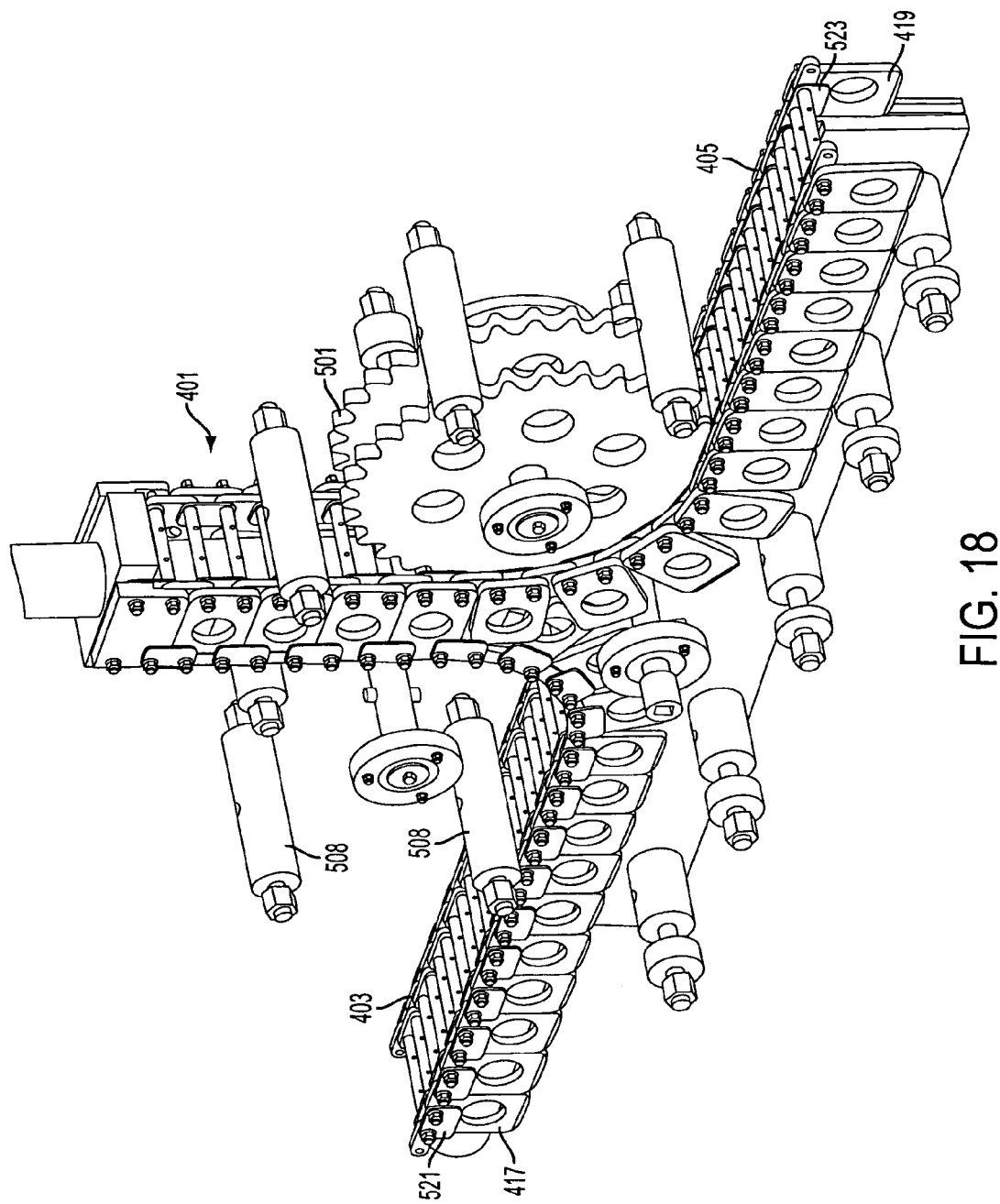
FIGS. 18-19 show perspective views of components of the second embodiment of the chain lift system, some components shown separately from other components for the purposes of illustration.
Figure 19:
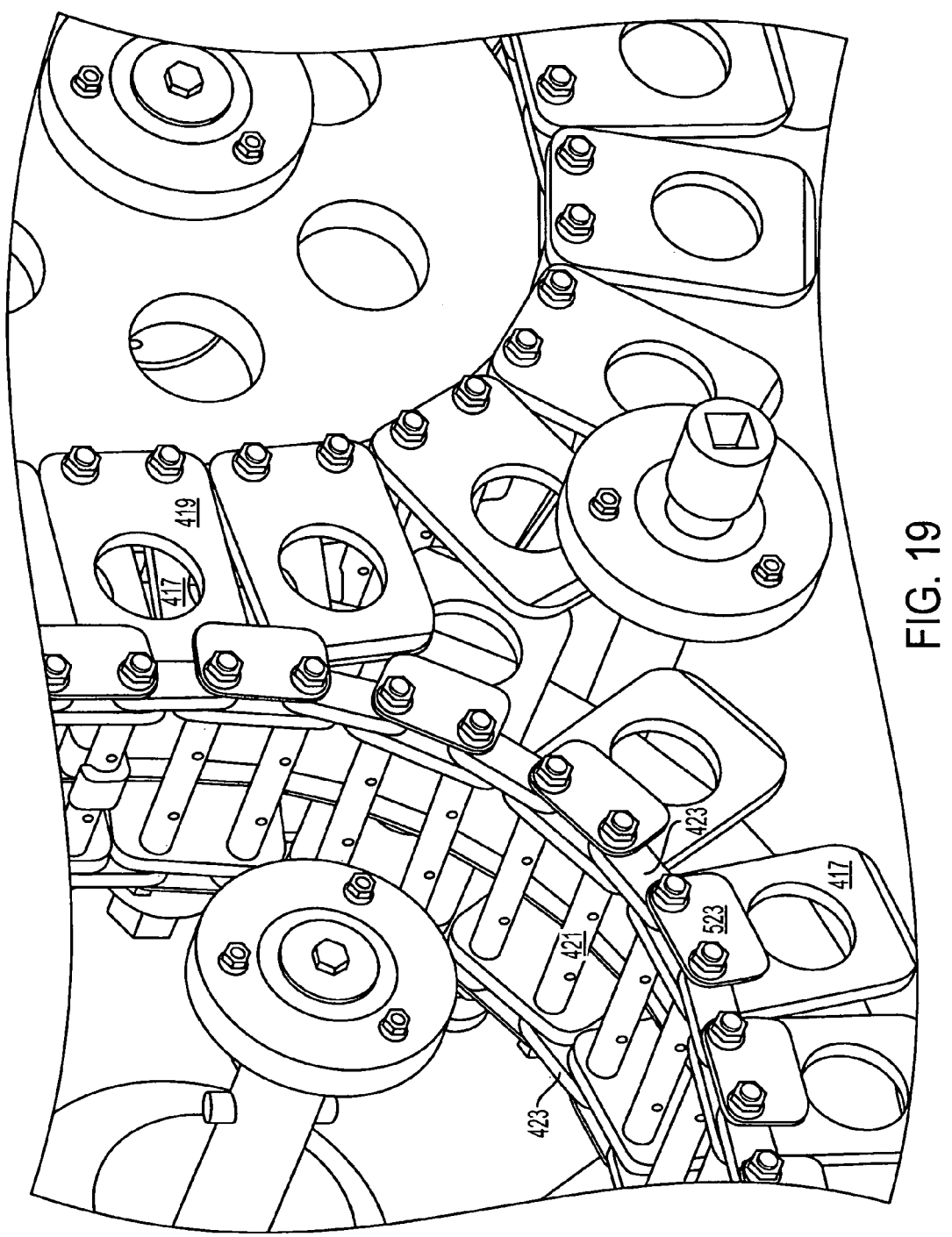

FIGS. 17-19 show a second embodiment of a chain lift system 101 in which similar components to those discussed above with respect to the first embodiment are labeled with the same reference numbers previously used. As can be observed in FIGS. 17-19, the general configuration of components is very similar to that of the first embodiment discussed above. As in the first embodiment, this second embodiment has a support structure 507 having a front plate 509 and rear plate 511, to which are connected sprockets 501 used to move chain assemblies 403 and 405. As shown in FIG. 17, the plates of the support structure 507 are fixed relative to one another and relative to the assembly mechanism 407 with support bars 508.

A point of distinction between the first and second embodiments is the method by which the chain assemblies 403 and 405 engage with one another. In the first embodiment discussed above there was engagement between a pedestal 425 and button 427 on an inner link plate 417 and a notch 429 in an outer link plate 419. In the second embodiment shown in FIGS. 17-19, the chain assemblies 403 and 405 engage one another through interaction between primary link plates 417 and 419 and secondary link plates 521 and 523. The primary link plates 417 and 419 of this embodiment are analogous to the link plates 417 and 419 of the first embodiment discussed above.

In this embodiment, the roller links 415 of the inner chain assembly 403 have primary inner link plates 417 positioned inside cross bars 423, and in addition have secondary inner link plates 521 positioned on the ends of the roller link rods 421, outside the cross bars 423. The secondary inner roller link plates 521 straddle two inner roller links 415 (comprised of two rods 421 connected by two cross bars 423), just as do the primary inner link plates 417 (as discussed above regarding the inner link plates 417 of the first embodiment). Because the cross bar 423, which has some thickness, is positioned between the primary and secondary inner link plates 417 and 521, there is necessarily some distance between the outer surface of the primary inner link plate 417 and the inner surface of the secondary inner link plate 521. This distance provides a channel (between the primary and secondary inner link plates 417 and 521) into which the primary outer link plate 419 of the outer chain assembly 405 can be positioned as the chain assemblies 403 and 405 are zippered together.

In this embodiment, the roller links 415 of the outer chain assembly 405 have primary outer link plates 419 positioned outside cross bars 423, and in addition have secondary outer link plates 523 positioned inside the cross bars 423. The secondary outer link plates 523 are best shown in FIG. 18. Similar to the construction of the inner chain assembly 403 of this embodiment, both the primary and the secondary outer roller link plates 419 and 523 straddle two outer roller links 415 (comprised of two rods 421 connected by two cross bars 423). Also similar to the inner chain assembly 403 of this embodiment, because the cross bar 423, which has some thickness, is positioned between the primary and secondary outer link plates 419 and 523, there is a channel into which the primary inner link plate 417 of the inner chain assembly 403 can be positioned as the chain assemblies 403 and 405 are zippered together.

In this second embodiment, the primary outer link plates 419 of the outer chain assembly 405 engage with the inner chain assembly 403 when the primary outer link plates 419 are positioned in the channel between a primary inner link plate 417 and a secondary inner link plate 521. Likewise, the primary inner link plates 417 engage with the outer chain assembly 405 when the primary inner link plates 417 are positioned in the channel between a primary outer link plate 419 and a secondary outer link plate 523. Positioning of the link plates 417 and 419 in the respective channels is made easier by a taper on the end of each link plate 417 and 419, decreasing the thickness of each link plate 417 and 419 at the end that initially enters the channel. Such tapering is preferred, but is not a requirement of all embodiments.

In both circumstances, because of the vertical offset in the alignment of the inner and outer chain assemblies 403 and 405, as discussed above with respect to the first embodiment, a primary and secondary inner link plate 417 and 521 overlaps more than one of each of a primary and secondary outer link plate 419 and 523, and vice versa as regards the overlap of more than one primary and secondary inner link plates 417 and 521 by each primary and secondary outer link plate 419 and 523. That is, for example, as the chain assemblies 403 and 405 are zippered, the outer link plates 419 and 523 are generally aligned with the inner roller links 415, and therefore overlap two adjacent primary inner link plates 417 and two adjacent secondary inner link plates 521, both of which straddle inner roller links 415, rather than being aligned with inner roller links 415.

As described above with respect to the interlinking of an embodiment having link plates 417 and 419 with buttons 427 and notches 429, the interlinking of the chain assemblies 403 and 405 of the second embodiment having primary link plates 417 and 419 positioned in a channel between primary and secondary link plates of another chain assembly, provides support specifically to oppose disruption of the ordered configuration of the column 401 in the horizontal dimension. Also as described for the first embodiment, the construction of the chain assemblies 403 and 405 having adjacent primary link plates that abut one another restrains the column 401 so that link plates and roller links 415 move vertically in concert. Through these relationships, then, the erected column 401 is provided with sufficient rigidity.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A mast erection system comprising at least two chain assemblies, said chain assemblies able to cooperatively interact to form a generally rigid column, wherein a first of the chain assemblies comprises a plurality of first links and a plurality of first plates, each first plate connecting a respective adjacent pair of the first plurality of links, each first plate having a face from which protrudes a pedestal;

wherein a second of the chain assemblies comprises a plurality of second links and a plurality of second plates, each second plate directly connecting a respective adjacent pair of the second plurality of links end to end, each second plate having a notch therein at the circumference thereof and wherein, when said first and second chain assemblies are brought into alignment to form said generally rigid column, the pedestal of a respective first plate of the first chain assembly is positioned via an edge of one of the second plates of the second chain assembly into the notch of another of the second plates adjacent to the one second plate so that the pedestal is generally constrained between the one and the adjacent other of the second plates in the general direction of said rigid column.

2. A mast erection system comprising:

at least two chain assemblies, said chain assemblies able to cooperatively interact to form a generally rigid column;

a cable assembly connected to at least one of said chain assemblies;

a mechanism for moving portions of said chain assemblies into cooperative alignment; and an attachment means for connecting said cable assembly to said chain assembly, wherein said attachment means includes a plurality of hooks.

3. The mast erection system of claim 2, further comprising an attachment means for connecting said cable assembly to said chain assembly.

4. The mast erection system of claim 2, further comprising a drive means to operate said mechanism for moving portions of said chain assemblies.

5. The mast erection system of claim 2, further comprising a generally rigid column comprised of said chain assemblies; wherein at least a portion of said cable assembly traverses a portion of the length of said generally rigid column, said portion of said cable assembly being positioned in a space generally between said chain assemblies.

6. The mast erection system of claim 5 wherein said portion of said cable assembly is enclosed within said column.

7. A telescoping locking mast assembly comprising:

a mast comprising at least two nested mast segments capable of telescopic extension to a locked position; and a mast erection system capable of extending said mast into said locked position, said mast erection system comprising: at least two chain assemblies, said chain assemblies able to cooperatively interact to form a generally rigid column; a cable assembly connected to at least one of said chain assemblies; and a mechanism for moving portions of said chain assemblies into cooperative alignment, wherein said chain assemblies comprise links connected by plates; wherein a first of the chain assemblies comprises a plurality of plates each having a first face from which protrudes a pedestal topped by a button; wherein a second of the chain assemblies comprises a plurality of plates each having a notch therein at the circumference thereof;

wherein when said first and second chain assemblies are brought into alignment to form said generally rigid column, a pedestal of each of a plurality of select plates of said first chain assembly is positioned in a respective notch of each of a plurality of select plates of said second chain assembly so that each of said plurality of select plates of said second chain assembly is generally constrained between a face and a button of each of the plurality of select plates of said first chain assembly from motion in the general direction of protrusion of said pedestal of each of the plurality of select plates of said first chain assembly; and wherein each of the plurality of select plates of the second chain assembly partially overlaps a respective two adjacent plates of the plurality of select plates of the first chain assembly when said first and second chain assemblies are brought into alignment to form said generally rigid column.

8. A mast erection system, comprising:

at least two chain assemblies, said chain assemblies able to cooperatively interact to form a generally rigid column, wherein said chain assemblies comprise links connected by plates; wherein a first of the chain assemblies comprises a plurality of plates each having a first face from which protrudes a pedestal topped by a button; wherein a second of the chain assemblies comprises a plurality of plates each having a notch therein at the circumference thereof, wherein when said first and second chain assemblies are brought into alignment to form said generally rigid column, a pedestal of each of a plurality of select plates of said first chain assembly is positioned in a respective notch of each of a plurality of select plates of said second chain assembly so that each of said select plates of said second chain assembly is generally constrained between a face and a button of each of the plurality of select plates of said first chain assembly from motion in the general direction of protrusion of said pedestal of each of the plurality of select plates of said first chain assembly, and wherein each of the plurality of select plates of the second chain assembly partially overlaps a respective two adjacent plates of the plurality of select plates of the first chain assembly when said first and second chain assemblies are brought into alignment to form said generally rigid column.

9. The mast erection system of claim 8, wherein the links of each chain assembly comprise a series of roller links and the plates of each chain assembly comprise a plurality of opposing pairs of plates, wherein each roller link comprises one or more cross bars and a plurality of rods, each of the rods extending through the one or more cross bars, and wherein one of the rods of a respective roller link connects one of the opposing pair of plates and another of the rods of the respective roller link connects another of the opposing pair of plates.

* * * * *